United States Patent
Lawrence et al.

(10) Patent No.: US 11,520,952 B2
(45) Date of Patent: Dec. 6, 2022

(54) SLUG FLOW INITIATION IN FLUID FLOW MODELS

(71) Applicant: Schlumberger Technology Corporation, Sugar Land, TX (US)

(72) Inventors: Chris John Lawrence, Oslo (NO); Zheng Gang Xu, Kjeller (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 354 days.

(21) Appl. No.: 16/632,517

(22) PCT Filed: Jul. 19, 2017

(86) PCT No.: PCT/EP2017/068206
§ 371 (c)(1),
(2) Date: Jan. 20, 2020

(87) PCT Pub. No.: WO2019/015749
PCT Pub. Date: Jan. 24, 2019

(65) Prior Publication Data
US 2021/0165930 A1    Jun. 3, 2021

(51) Int. Cl.
*G06F 30/18* (2020.01)
*E21B 41/00* (2006.01)
*G06F 113/14* (2020.01)

(52) U.S. Cl.
CPC .............. *G06F 30/18* (2020.01); *E21B 41/00* (2013.01); *E21B 2200/20* (2020.05); *G06F 2113/14* (2020.01)

(58) Field of Classification Search
CPC ....... G06F 30/18; E21B 41/00; E21B 2200/20
USPC ............................................................ 703/9
See application file for complete search history.

(56) References Cited

U.S. PATENT DOCUMENTS

| | | | | |
|---|---|---|---|---|
| 5,256,171 A | * | 10/1993 | Payne | B01D 19/0057 95/212 |
| 5,544,672 A | * | 8/1996 | Payne | E21B 43/34 137/171 |
| 5,550,761 A | * | 8/1996 | Pauchon | G05B 17/02 73/861.04 |
| 5,561,245 A | * | 10/1996 | Georgi | E21B 47/10 73/861.04 |

(Continued)

FOREIGN PATENT DOCUMENTS

| | | |
|---|---|---|
| WO | 2015/077783 A1 | 5/2015 |
| WO | 2016/118807 A1 | 7/2016 |
| WO | WO-2019015749 A1 * | 1/2019 ............. E21B 41/00 |

OTHER PUBLICATIONS

Danielson et al. (Hydrodynamic slug flow modeling, BHR Group 2010, pp. 345-356) (Year: 2010).*

(Continued)

*Primary Examiner* — Iftekhar A Khan

(57) ABSTRACT

A method for modeling slug flow includes receiving a fluid flow model including a representation of a conduit and a multiphase fluid flow therein. A slug bubble birth rate is determined in the multiphase fluid flow. The slug bubble birth rate is determined based at least partially on a difference between a slug front velocity and a slug tail velocity. A slug bubble is initiated in the fluid flow model based at least partially on the slug bubble birth rate. Data representative of the slug flow is displayed in the fluid flow model after the slug bubble is initiated.

18 Claims, 8 Drawing Sheets

(56) References Cited

U.S. PATENT DOCUMENTS

| | | | | |
|---|---|---|---|---|
| 5,708,211 | A * | 1/1998 | Jepson | G01F 1/36 |
| | | | | 73/861.04 |
| 6,390,114 | B1 * | 5/2002 | Haandrikman | F17D 1/005 |
| | | | | 137/187 |
| 7,222,542 | B2 * | 5/2007 | Eken | E21B 43/12 |
| | | | | 73/861.63 |
| 7,434,621 | B2 * | 10/2008 | Aarvik | E21B 43/34 |
| | | | | 166/267 |
| 8,459,285 | B2 * | 6/2013 | Calvert | G05D 7/0635 |
| | | | | 702/50 |
| 10,311,173 | B2 * | 6/2019 | Havre | G06F 30/20 |
| 10,463,990 | B2 * | 11/2019 | Becquin | F04B 19/06 |
| 10,533,403 | B2 * | 1/2020 | Lawrence | E21B 43/12 |
| 2003/0225533 | A1 * | 12/2003 | King | G01N 9/24 |
| | | | | 702/50 |
| 2005/0216242 | A1 * | 9/2005 | Flax | G06F 30/20 |
| | | | | 703/9 |
| 2006/0041392 | A1 * | 2/2006 | Korske | F04D 31/00 |
| | | | | 702/50 |
| 2010/0155075 | A1 * | 6/2010 | Holm | F17D 1/005 |
| | | | | 166/357 |
| 2010/0299122 | A1 * | 11/2010 | Golinveaux | G05B 17/02 |
| | | | | 703/9 |
| 2012/0165995 | A1 * | 6/2012 | Crawley | G05D 7/00 |
| | | | | 700/282 |
| 2013/0317791 | A1 * | 11/2013 | Danielson | G06F 30/20 |
| | | | | 703/2 |
| 2014/0020783 | A1 * | 1/2014 | Zazovsky | F16L 9/00 |
| | | | | 138/141 |
| 2015/0040658 | A1 * | 2/2015 | Abyzov | G01T 1/1606 |
| | | | | 73/199 |
| 2015/0149138 | A1 * | 5/2015 | Lawrence | E21B 43/12 |
| | | | | 703/9 |
| 2015/0286755 | A1 * | 10/2015 | Johansen | G06F 17/16 |
| | | | | 703/2 |
| 2016/0098502 | A1 * | 4/2016 | Havre | E21B 43/00 |
| | | | | 703/9 |
| 2016/0245073 | A1 * | 8/2016 | Hansen | E21B 47/10 |
| 2016/0245781 | A1 * | 8/2016 | Ahmad | E21B 47/107 |
| 2016/0290841 | A1 * | 10/2016 | Cadalen | G01F 1/74 |
| 2018/0010429 | A1 * | 1/2018 | Willberg | E21B 49/087 |
| 2020/0141208 | A1 * | 5/2020 | Agrawal | E21B 41/0092 |

OTHER PUBLICATIONS

Taitel et al. (Slug flooow modeling for downward inclined pipe flow: theoretical considerations, International Journal of Multiphase Flow 26 (2000) 833 -844) (Year: 2000).*

Issa, et al., "Numerical prediction of instabilities and slug formation in horizontal two-phase flows," 3rd International Conference on Multiphase Flow, ICMF'98, Lyon, France, Jun. 6-10, 1998.

Issa, et al., "Simulation of slug flow in horizontal and nearly horizontal pipes with the two-fluid model," International Journal of Multiphase Flow, vol. 29, No. 1, January, pp. 69-95, 2003.

Jeffreys, "On the formation of water waves by wind," Proceedings of the Royal Society A, 107, pp. 189-206, 1925.

Kadri, et al., "Prediction of the transition from stratified to slug flow or roll-waves in gas-liquid horizontal pipes," International Journal of Multiphase Flow, in press, 2009.

Khor, "Three phase liquid-liquid-gas stratified flow in pipelines," PhD Thesis. Imperial College London, Jan. 1998 (document split in 2 Parts).

King, "Experimental and modelling studies of transient slug flow," PhD Thesis, Imperial College London, Mar. 1998 (document split in 4 Parts).

Kjeldby, et al., "Lagrangian Slug Flow Modeling and Sensitivity on Hydrodynamic Slug Initiation Methods in A Severe Slugging Case," International Journal of Multiphase Flow, 53: 29-39 (2013).

Kjolaas et al., "Simulation of Hydrodynamic Slug Flow Using The Ledaflow Slug Capturing Model," Proc. 16th International Conference on Multiphase Production Technology, Cannes, pp. 365-383, Jun. 12-14, (2013).

Kokal, "An Experimental Study of Two-Phase Flow in Inclined Pipes," PhD Thesis, University of Calgary, Calgary, 1987 (document split in 6 Parts).

Kordyban and Okleh (1993). Interaction of linear and large wave instabilities in the formation of slugs. ASME, Gas-liquid flows, 165, 109-118.

Kordyban, "Some Details of Developing Slugs in Horizontal Two-Phase Flow," AIChE Journal, 31, 802, 1985.

Larsen, et al., "PeTra: a novel computer code for simulation of slug flow," SPE 38841, pp. 965-976, 1997.

Laurinat, et al., "Pressure Drop and Film Height Measurements for Annular Gas-Liquid Flow," International Journal of Multiphase Flow, vol. 10, No. 3, pp. 341-356, 1984.

Lin, et al., "Prediction of the initiation of slugs with linear instability theory," International Journal of Multiphase Flow, 12(1): pp. 79-98, 1986.

Lyczkowski, "Characteristics and stability analysis of transient one-dimensional two-phase flow equations and their finite-difference approximations," Nuclear Science and Engineering, vol. 66, pp. 378-396, 1978.

Manfield, "Experimental, computational and analytical studies of slug flow," PhD Thesis. Imperial College London, 2000 (document split in 3 Parts).

Manolis, et al., "The Effect of Pressure on Slug Frequency on Two-Phase Horizontal Flow," Presented at the 2nd Int. Conference on Multiphase Flow, Kyoto, Japan, 1995, pp. 347-354.

Matar, et al., "Two-Layer Flow with One Viscous Layer in Inclined Channels," Mathematical Modeling of Natural Phenomena, 3(1) pp. 126-148, 2008.

Miya, et al., "A model for roll waves in gas-liquid flow," Chemical Engineering Science, vol. 26, pp. 1915-1932, 1971.

Mo, et al., "Quasi-3D Modelling of Two-Phase Slug Flow in Pipes," The Journal of Computational Multiphase Flows, Mar. 1, 2014, pp. 1-12.

Moissis, et al., "Entrance effects in a two-phase slug flow," Journal of Heat Transfer, Trans. ASME, vol. 81, pp. 29-39, Feb. 1962.

Moody, "Friction Factors for Pipe Flow," Transactions of the American Society of Mechanical Engineers., vol. 66, pp. 371-684, 1944.

Ng, "Interfacial structure of stratified pipe flow," PhD Thesis. Imperial College London, 2002 (document split in 4 Parts).

Nicklin, "Two-Phase Flow in Vertical Tubes," Transactions of the Institution of Chemical Engineers, vol. 40, pp. 61-68, 1962.

Nydal et al., "Dynamic Slug Tracking Simulations for Gas-Liquid Flow in Pipelines," Chemical Engineering Communications, vol. 141-142, Issue 1, pp. 13-39, (1996).

Pauchon, et al., "TACITE: a transient tool for multiphase pipeline and well simulation," SPE 28545, pp. 311-326, 1994.

Ramshaw, et al., "Characteristics, stability, and short-wavelength phenomena in two-phase flow equation systems," Nuclear Science and Engineering: 66, 93-102, 1978.

Ransom, et al., "Hyperbolic Two-Pressure Models for Two-Phase Flow Revisited," Journal of Computational Physics, vol. 75, No. 2 pp. 498-505, 1988.

Ransom, et al., "Hyperbolic Two-Pressure Models for Two-Phase Flow," Journal of Computational Physics, vol. 53, pp. 124-151, 1984.

Renault, "A Lagrangian slug capturing scheme for gas-liquid flows in pipes," PhD thesis, Norwegian University of Science and Technology, Trondheim, Norway, 2007 (document split in 5 Parts).

Saurel, "A multiphase model for compressible flows with interfaces, shocks, detonation waves and cavitation," Journal of Fluid Mechanics, vol. 431, pp. 239-271, 2001.

Saurel, et al., "A multiphase Godunov method for compressible multifluid and multiphase flows," Journal of Computational Physics, vol. 150, pp. 425-467, 1999.

Schulkes, et al., "Slug Frequencies Revisited," Proc. 15th Int. Conf. Multiphase Production Technology, pp. 311-325, Cannes, France Jun. 15-17, (2011).

Shea, et al., "Slug Frequency Prediction Method Comparison," Proc. 4th N. Am. Conf. Multiphase Technology, Banff, Canada, Jun. 3-4, (2004).

(56) References Cited

OTHER PUBLICATIONS

Shemer, et al., "Visualization of the instantaneous velocity profiles in gas-liquid slug flow," Physicochemical Hydrodynamics vol. 8, pp. 243-253, 1987.
Simmons, et al., "Transition from stratified to intermittent flow in small angle upflows," International Journal of Multiphase Flow, vol. 1, pp. 509-516, 2001.
Soleimani, et al., "Critical liquid flows for the transition from the pseudo-slug and stratified patterns to slug flow," International Journal of Multiphase Flow, vol. 29, pp. 51-67, 2003.
Srichai, "High pressure separated two-phase flow," PhD Thesis. Imperial College London, Sep. 1994 (document split in 2 Parts).
Stewart, "Stability of Two-Phase Flow Calculations Using Two-Fluid Models," Journal of Computational Physics, vol. 33, pp. 259-270, 1979.
Stewart, et al., "Two-Phase Flow: Models and Methods," Journal of Computational Physics, vol. 56, pp. 363-409, 1984.
Taitel, et al., "A Model for Slug Frequency During Gas-Liquid Flow in Horizontal and Near Horizontal Pipes," International Journal of Multiphase Flow 3(6), pp. 585-596, 1977.
Taitel, et al., "Effect of gas compressibility on a slug tracking model," Chemical Engineering Science, vol. 53, No. 11, pp. 2089-2097, 1998.
Taitel, et al., "Slug Tracking Model for Hilly Terrain Pipelines," SPE Journal, vol. 5, No. 1, pp. 102-109, Mar. 2000.
Taitel, "Two-Phase Slug Flow," Advances in Heat Transfer, vol. 20, pp. 83-132, 1990.
Tronconi, "Prediction of Slug Frequency in Horizontal Two-Phase Slug Flow," AIChE Journal, vol. 36, pp. 701-709, 1990.
Ujang, et al., "Prediction of The Translational Velocity of Liquid Slugs in Gas-Liquid Slug Flow Using Computational Fluid Dynamics," Multiphase Science and Technology, vol. 20, pp. 25-79, 2008.
Ujang, et al., "Slug initiation and evolution in two-phase horizontal flow," International Journal of Multiphase Flow, vol. 32, pp. 527-552, 2006.
Ujang, "Studies of slug initiation and development in two-phase gas-liquid pipeline flow," PhD Thesis, Imperial College, London, UK, 2003' PART 1 (pp. 1-360) (document split in 2 Parts).
Ujang, "Studies of slug initiation and development in two-phase gas-liquid pipeline flow," PhD Thesis, Imperial College, London, UK, 2003' PART 2 (pp. 361-682) (document split in 2 Parts).
Valluri, et al., "Numerical simulation of the onset of slug initiation in laminar horizontal channel flow," International Journal of Multiphase Flow, 34(2) 206-225, 2008.
Wallis, et al., "The Onset of Slugging in Horizontal Stratified Air-Water Flow," International Journal of Multiphase Flow, vol. 1: pp. 173-193, 1973.
Wang, et al., "Development of Liquid Slug Length in Gas-Liquid Slug Flow along Horizontal Pipeline: Experiment and Simulation," Chinese Journal of Chemical Engineering, Chemical Industry Press, Beijing, CN, vol. 14, No. 5, Oct. 1, 2006, pp. 626-633.
Watson, et al., "The Modelling of Slug Flow Properties," 10th International Conference Multiphase Production Technology, pp. 67-86, Cannes, France: Jun. 13-15, (2001).
Woods, et al., "Frequency and development of slugs in a horizontal pipe at large liquid flows," International Journal of Multiphase Flow, 32: 902-925, 2006.
Woods, et al., "Influence of Froude number on physical processes determining frequency of slugging in horizontal gas-liquid flows," International Journal of Multiphase Flow, 25:1195-1223, 1999.
Woods, et al., "Mechanism of slug formation in downwardly inclined pipes," International Journal of Multiphase Flow, vol. 26: pp. 977-998, 2000.
Woods, et al., "Relation of slug stability to shedding rate," International Journal of Multiphase Flow, vol. 22, pp. 809-828, 1996.
Wu, et al., "Flow Pattern Transitions in Two-Phase Gas/Condensate Flow at High Pressure in An 8-Inch Horizontal Pipe," In: Proc BHRA Conf., The Hague, Netherlands, 13-21, 1987.
Zabaras, "Prediction of Slug Frequency for Gas/Liquid Flows," SPE 65093, SPE Journal, vol. 5, Issue 3: pp. 252-258, 2000.

Zheng, et al., "Slug Flow Behaviour In A Hilly Terrain Pipeline," International Journal of Multiphase Flow, vol. 20, No. 1, pp. 63-79, 1994.
Zoeteweij, "Long liquid slugs in horizontal tubes," PhD thesis, University of Delft, Netherlands, ISBN 978-90-9022512-8, 2007.
Andritsos, et al., "Effect of liquid viscosity on the stratified-slug transition in horizontal pipe flow," International Journal of Multiphase Flow, vol. 15, Issue 6, Nov.-Dec. 1989, pp. 877-892.
International Search Report and Written Opinion for the International patent application PCT/EP2017/068206 dated Sep. 18, 2017.
International Preliminary Report on Patentability for the International patent applciation PCT/EP2017/068206 dated Jan. 30, 2020.
Manolis I. G. (Oct. 1995). High pressure gas-liquid slug flow. Ph.D Thesis, Imperial College of Science, Technology and Medicine, University of London.
Nydal O.J. (1991). An experimental investigation of slug flow. Ph.D. thesis, University of Olso, Oslo, Norway. (document split in 2 Parts).
Lawrence et al., "Validation of a physically-based model for slug initiation and evolution in hydrodynamic slug flow", BHR-2015-A1, 2015.
Lawrence et al., "Mechanistic models for three-phase stratified and slug flows with dispersions", BHR-2013-E6, pp. 283-296, 2013.
Wallis, "One-dimensional Two-phase flow", Chapter 10 entitled "Slug Flow", pp. 282-314, 1969.
Al-Safran "Investigation and prediction of slug frequency in gas/liquid horizontal pipe flow," Journal of Petroleum Science and Engineering, 69, pp. 143-155, 2009.
Al-Safran, et al., "Investigation of slug flow characteristics in the valley of a hilly-terrain pipeline," International Journal of Multiphase Flow, 31: 337-357, 2005.
Al-Safran, et al., "Prediction of slug length distribution along a hilly terrain pipeline using a slug tracking model," Proceedings of the 10th International Multiphase Conference, Cannes, France, Jun. 13-15, pp. 49-66, 2001.
Andreussi, "Droplet transfer in two-phase annular flow," International Journal of Multiphase Flow, vol. 9, No. 6, pp. 697-713, 1983.
Andreussi, "An investigation of void fraction in liquid slugs for horizontal and inclined gas-liquid pipe flow," International Journal of Multiphase Flow, vol. 15, No. 6, pp. 937-946, 1989.
Andreussi, et al., "Stratified gas-liquid flow in downwardly inclined pipes," International Journal of Multiphase Flow. vol. 13, pp. 565-575, 1987.
Andritsos, et al., "Interfacial instabilities for horizontal gas-liquid flows in pipelines," International Journal of Multiphase Flow, vol. 13, No. 5, pp. 583-603, 1987.
Baer, et al., "A two-phase mixture theory for the deflagration-to-detonation transition (DDT) in reactive granular materials," International Journal of Multiphase Flow, vol. 12, pp. 861-889, 1986.
Barnea, et al., "A model for slug length distribution in gas-liquid slug flow," International Journal of Multiphase Flow, vol. 19, No. 5, pp. 829-838, 1993.
Bendiksen, "An experimental investigation of the motion of long bubbles in inclined tubes," International Journal of Multiphase Flow, vol. 10, No. 4, 1984, pp. 467-483.
Bendiksen, et al., "Physical and Numerical Simulation of Dynamics Two-Phase Flow in Pipelines with Application to Existing Oil-Gas Field Lines," Conf. on Multiphase Flow in Industrial Plants, Bologna, Sep. 27-29, 1988.
Bendiksen, et al., "The dynamic two-fluid model OLGA: theory and application," SPE Production Engineering, pp. 171-180, May 1991.
Black, et al., "Tests of the TRAC code against known analytical solutions for stratified flow," Paper presented at the 14th NRC Water Reactor Safety Meeting, Gaithsburg, Maryland, USA, Oct. 1986.
Bonizzi, et al., "A model for simulating gas bubble entrainment in two-phase horizontal slug flow," International Journal of Multiphase Flow, 29, 1685-1717, 2003.
Bonizzi, et al., "Flow regime independent, high resolution multi-field modelling of near-horizontal gas-liquid flows in pipelines," International Journal of Multiphase Flow, 35, 34-46, 2009.
Bonizzi, "Transient one-dimensional modelling of multiphase slug flows," PhD Thesis, Dept. of Mechanical Engineering, Imperial College, London, 2003.

(56) References Cited

OTHER PUBLICATIONS

Boure, "Two-phase flow models: the closure issue," Multiphase Science and Technology, Hewitt, G. F., Delhaye, J. and Zuber, N. editors. vol. 3, Chapter I, Hemisphere, New York, pp. 3-30, 1987.
Boure, "Wave phenomena and one-dimensional two-phase flow models part I: kinematic waves; experimental results; theory," Multiphase Science and Technology, vol. 9, pp. 1-35, 1997.
Boure, "Wave phenomena and one-dimensional two-phase flow models part II: a reference case; flow, without mass transfer, of two fluids of constant properties;" Multiphase Science and Technology, vol. 9, pp. 37-62, 1997.
Boure, "Wave phenomena and one-dimensional two-phase flow models part III: general case; general drift flux models; other two-fluid models;" Multiphase Science and Technology, vol. 9, pp. 63-107, 1997.
Brill et al., "Analysis of two-phase tests in large-diameter flow lines in Prudhoe Bay field.", SPE Journal, June, pp. 363-378, 1981.
Cook, et al., "Slug length prediction in near horizontal gas-liquid intermittent flow," Chemical Engineering Science, 55: 2009-2018, 2000.
Coquel, et al., "A numerical method using upwind schemes for the resolution of two-phase flows," Journal of Computational Physics, vol. 136, pp. 272-288, 1997.
Coquel, et al., "An Energy Relaxation Method for Inviscid Real Fluid Flows and Application to Two-Phase Flows," Baines, M. J. editor Numerical Methods for Fluid Dynamics, VI, Oxford University Press, Oxford.1998, pp. 43-51.
Coquel, et al., "Relaxation of energy and approximate Riemann solvers for general pressure laws in fluid dynamics," SIAM Journal on Numerical Analysis, vol. 35, No. 6, pp. 2223-2249, 1998.
Dallman, et al., "Interpretation of Entrainment in Annular Gas-Liquid Flows,". Two-phase Momentum, Heat, Mass Transfer in Chemical, Process, and Energy Engineering Systems; Durst, F., Tsiklauri, G. V. and Afgan, N. H. editors, 1984.
Daniels, et al., "An implicit one-dimensional two-phase compressible flow solver for pipelines," Multiphase Science and Technology, vol. 14, No. 2, pp. 107-202, 2002.
Davies, "Studies of Two-phase Intermittent Flow in Pipelines," Ph.D. Thesis, University of London, London, UK, 1992 (document split in 2 Parts).
De Henau, "A Study of Terrain-Induced Slugging in Two-Phase Flow Pipelines," PhD Thesis, University of Waterloo, Waterloo, Ontario, Canada, 1992 (document split in 5 Parts).
De Henau, et al., "Transient two-fluid model for the simulation of slug flow in pipelines—1. Theory," International Journal of Multiphase Flow, vol. 21, pp. 335-249, 1995.
De Henau, et al., "Transient two-fluid model for the simulation of slug flow in pipelines—2. Validation," International Journal of Multiphase Flow, vol. 21, pp. 351-363, 1995.
Ducker, et al., "A model for gas-liquid slug flow in horizontal and near horizontal tubes," Industrial & Engineering Chemistry Fundamentals 14, 337-347, 1975.
Fan, et al., "Initiation of slugs in horizontal gas-liquid flows," AIChE Journal, Fluid Mechanics and Transport Phenomena, 39(11) 1741-1753, 1993.
Gilchrist, et al., "Modelling of Slug Flow Accounting for Slug Growth and Acceleration Effects," Multiphase Production edited by A. P. Burns, Proceedings of the 5th International Conference on Multiphase Production, Cannes, France, pp. 265-280, 1991.
Glimm, et al., "Two-phase modelling of a fluid mixing layer," Journal of Fluid Mechanics, vol. 378, pp. 119-143, 1999.
Glimm, et al., "Two-Pressure Two-Phase Flow," Chen, C., Li, Y. and Zhu, X. editors, Nonlinear Partial Differential Equations. World Scientific, Singapore, 1998, pp. 124-148.
Gregory, et al., "Correlation of Liquid Slug Velocity and Frequency in Horizontal Concurrent Gas-Liquid Slug Flow," AIChE Journal 15(6), 933-935, 1969.
Gregory, et al., "Correlation of the liquid volume fraction in the slug for horizontal gas-liquid slug flow," International Journal of Multiphase Flow, vol. 4, pp. 33-39, 1978.
Greskovich, et al., "Slug Frequency in Horizontal Gas-Liquid Slug Flow," Industrial & Engineering Chemistry Process Design and Development, 11(1): pp. 317-318, 1972.
Gu, et al., "Experimental Investigation of Slug Development on Horizontal Two-Phase Flow," Chinese Journal of Chemical Engineering (English), 16(2) 171-177, 2008.
Hale, "Slug formation, growth and decay in gas-liquid flows," PhD Thesis, Imperial College London, London, UK, 2000 (document split in 2 Parts).
Henriksson, et al., "Mechanistic Models for Three-Phase Stratified and Slug Flows with Dispersions," 16th International Conference on Multiphase Production Technology at Cannes, France, Jun. 12-14, (2013).
Heywood, et al., "Slug Flow of Air-Water Mixtures in A Horizontal Pipe: Determination of Liquid Holdup by Gamma-Ray Absorption," Chemical Engineering Science, 34: pp. 12-30, 1979.
Hill, et al., "A new approach to the prediction of slug frequency," SPE 20629, Presented at SPT ATEC, New Orleans, LA, 1990.
Hill, et al., "Slug flow: occurrence, consequence and prediction," SPE 27960, Presented at University of Tulsa Centennial Petroleum Engineering Symposium, Tulsa, OK, USA, 1994.
Hu, et al., "A Model for Tracking The Evolution of Slugs and Waves in Straight Pipelines," Proc. 6th International Conference Multiphase Flow, ICMF 2007, Leipzig, Germany, Jul. 9-13, (2007).
Hu, et al., "Void distribution in the liquid layer in stratified wavy flows measured with an X-ray Computed Tomography Instrument," 14th International Conference on Multiphase Production Technology, Cannes, France, Jun. 17-19, 2009.
Hurlburt, et al., "Prediction of the transition from stratified to slug and plug flow for long pipes," International Journal of Multiphase Flow, 28, 707-729, 2002.
Ishii, et al., "Two-fluid model and hydrodynamic constitutive relations," Nuclear Engineering and Design, vol. 82. Issue 2-3, pp. 107-126, 1984.

\* cited by examiner

SLUG FLOW INITIATION IN FLUID FLOW MODELS

BACKGROUND

Slug flow is a type of multiphase fluid flow that can occur in fluid transport lines (e.g., conduits, pipes, etc.). Slug flow most commonly occurs in gas-liquid flows, with either a single liquid phase (e.g., oil or water) or with two or more liquid phases simultaneously present (e.g., oil and water). Slug flow may also occur in liquid-liquid flows (sometimes referred to as "water slugging").

Gas-liquid slug flow is an intermittent flow in which regions of separated flow with large gas pockets ("slug bubbles") alternate with regions of dispersed flow ("slugs") in which small gas bubbles are dispersed into the liquid. Slug flow can form in two ways, depending on whether the prevailing flow is separated or fully dispersed. If the prevailing flow is separated (e.g., stratified or annular), the transition to slug flow occurs by the formation of new slugs. If the prevailing flow is fully dispersed (e.g., bubbly), the transition to slug flow occurs by the formation of new slug bubbles.

There are various types of slug flow, which are generally referred to by the conditions that lead to their creation. For example, operational or "start-up" slugs may occur after flow through a pipeline is started (e.g., after stopping flow) such that liquid has settled to low points in the pipe, and then restarting the flow. Similarly, "terrain" slugs may be caused by the topography of the pipelines, and hydrodynamic slugs may be caused during "normal" conditions by the presence of one or more regions where there is too much liquid for separated flow to be stable and too little liquid for bubbly flow to be stable.

Multiphase flow, including slug flow, may be modeled and simulated. Multi-dimensional simulation presents a challenge, however, as it may use an impractical amount of computing resources and/or time. Thus, at least for long pipelines, one-dimensional models may be employed, in which properties of the flow are averaged over the pipe cross-section. The model then describes how these averaged properties vary along the pipeline and with time.

Such models may implement various strategies for modeling slug flow. For example, in "slug tracking," the boundaries (front and tail) of the slugs are followed as they propagate along the pipe. Thus, the slugs and separated zones are represented on a Lagrangian grid, which is superimposed on the Eulerian grid used to solve the basic equations. In another example, "slug capturing," the underlying equations are resolved on a fine Eulerian grid, including the growth of large waves and the formation of slugs, so that each slug is represented.

These models may provide satisfactory results in a wide variety of contexts. However, some such methods of slug flow modeling and simulation may include long computation times, accuracy and/or stability issues, and/or tuning to match experimental or otherwise measured datasets, such as by using an iterative, trial-and-error process.

SUMMARY

A method for modeling slug flow is disclosed. The method includes receiving a fluid flow model including a representation of a conduit and a multiphase fluid flow therein. A slug bubble birth rate is determined in the multiphase fluid flow. The slug bubble birth rate is determined based at least partially on a difference between a slug front velocity and a slug tail velocity. A slug bubble is initiated in the fluid flow model based at least partially on the slug bubble birth rate. Data representative of the slug flow is displayed in the fluid flow model after the slug bubble is initiated.

A computing system is also disclosed. The computer system includes a processor and a memory system. The memory system includes a non-transitory computer-readable medium storing instructions that, when executed by the processor, cause the computing system to perform operations. The operations include receiving a fluid flow model including a representation of a conduit and a multiphase fluid flow therein. A slug bubble birth rate is determined in the multiphase fluid flow. The slug bubble birth rate is determined based at least partially on a difference between a slug front velocity and a slug tail velocity. A slug bubble is initiated in the fluid flow model based at least partially on the slug bubble birth rate. Data representative of the slug flow is displayed in the fluid flow model after the slug bubble is initiated.

A non-transitory computer-readable medium is also disclosed. The medium stores instructions that, when executed by at least one processor of a computing system, cause the computing system to perform operations. The operations include receiving a fluid flow model including a representation of a conduit and a multiphase fluid flow therein. A slug bubble birth rate is determined in the multiphase fluid flow. The slug bubble birth rate is determined based at least partially on a difference between a slug front velocity and a slug tail velocity. A slug bubble is initiated in the fluid flow model based at least partially on the slug bubble birth rate. Data representative of the slug flow is displayed in the fluid flow model after the slug bubble is initiated.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to obscure aspects of the embodiments.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
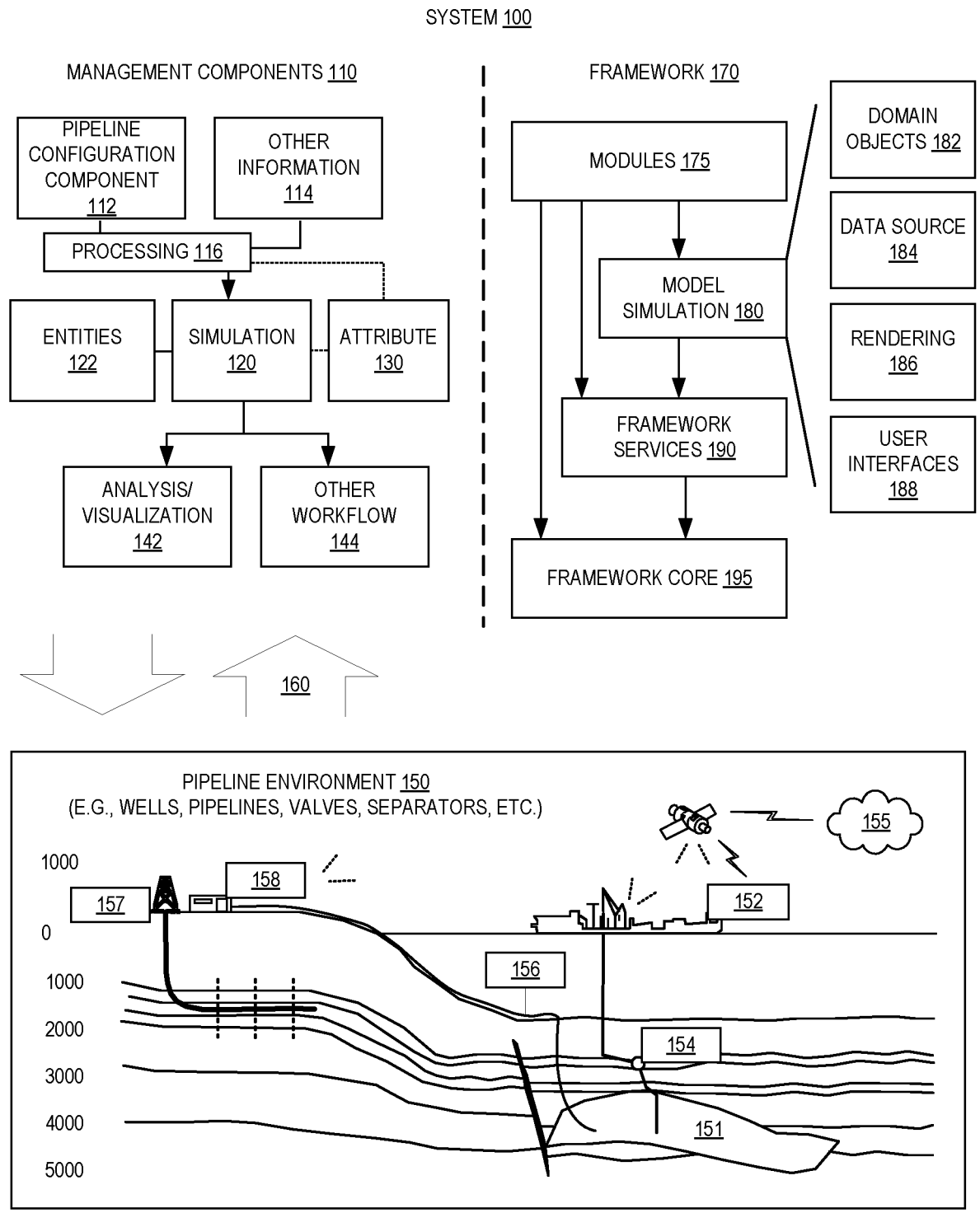
FIG. 1 illustrates an example of a system that includes various management components to manage various aspects of a pipeline environment, according to an embodiment.

FIG. 1 illustrates an example of a system 100 that includes various management components 110 to manage various aspects of a pipeline environment 150 (e.g., an environment that includes wells, transportation lines, risers, chokes, valves, separators, etc.). For example, the management components 110 may allow for direct or indirect management of design, operations, control, optimization, etc., with respect to the pipeline environment 150. In turn, further information about the pipeline environment 150 may become available as feedback 160 (e.g., optionally as input to one or more of the management components 110).

In the example of FIG. 1, the management components 110 include a pipeline configuration component 112, an additional information component 114 (e.g., fluid measurement data), a processing component 116, a simulation component 120, an attribute component 130, an analysis/visualization component 142 and a workflow component 144. In operation, pipeline configuration data and other information provided per the components 112 and 114 may be input to the simulation component 120.

In an example embodiment, the simulation component 120 may rely on pipeline components or "entities" 122. The pipeline components 122 may include pipe structures and/or equipment. In the system 100, the components 122 can include virtual representations of actual physical components that are reconstructed for purposes of simulation. The components 122 may include components based on data acquired via sensing, observation, etc. (e.g., the pipeline configuration 112 and other information 114). An entity may be characterized by one or more properties (e.g., a pipeline model may be characterized by changes in pressure, heat transfer, pipe inclination and geometry, etc.). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the pipeline environment 150, which may be relied on to simulate behavior of the pipeline environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as a simulator provided in OLGA® (Schlumberger Limited, Houston Tex. Further, in an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, pipeline engineers, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add- ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially-available OCEAN® framework where the model simulation layer 180 is the commercially-available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of pipeline configuration, one or more attributes based at least in part on pipeline configuration, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the pipeline environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well. As an example, the equipment 157 and/or 158 may include components, a system, systems, etc. for pipeline condition monitoring, sensing, valve modulation, pump control, analysis of pipeline data, assessment of one or more pipelines 156, etc. The pipelines 156 may include at least a portion of the well, and may form part of, or be representative of, a network of pipes which may transport a production fluid (e.g., hydrocarbon) from one location to another.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on pipeline configuration, seismic attribute(s), etc. As an example, a workflow may be a process implementable in the OCEAN® framework. As an example, a workflow may include one or more worksteps that access a module such as a plug-in (e.g., external executable code, etc.).

Figure 2:
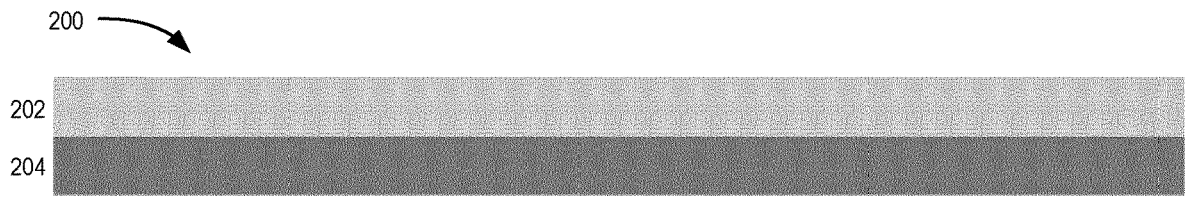
FIG. 2 illustrates a schematic view of a separated (e.g., stratified) flow, according to an embodiment.
Figure 3:
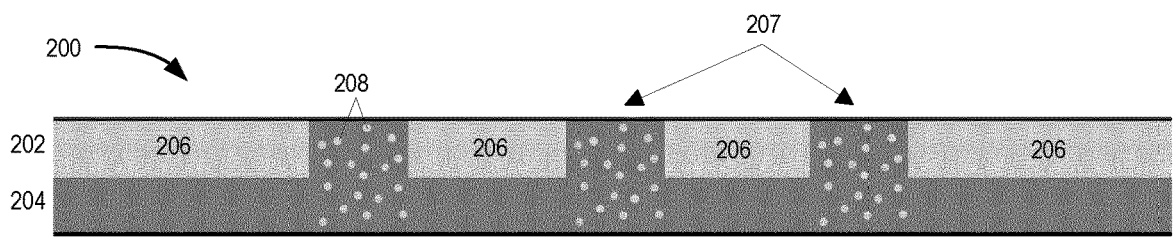
FIG. 3 illustrates a schematic view of slugs added to the stratified flow, according to an embodiment.

FIG. 2 illustrates a schematic view of a separated (e.g., stratified) flow, and FIG. 3 illustrates a schematic view of slugs added to the stratified flow, according to an embodiment. In FIGS. 2 and 3, a conduit (e.g., a pipe) 200 has a fluid flowing therethrough. The fluid is stratified into a first portion 202 and a second portion 204. The first portion 202 may be or include a gas such as hydrocarbons, steam, carbon dioxide, or a combination thereof. In another embodiment, the first portion 202 may be or include an immiscible liquid of lower density than the second portion 204. The second portion 204 may be or include a liquid such as hydrocarbons, steam, carbon dioxide, or a combination thereof In FIG. 3, the first portion 202 has transitioned into a plurality of slug bubbles 206 (i.e., a slug flow). The slug bubbles 206 may be or include the gas and be separated from one another by liquid slugs 207 formed from the second portion of the fluid. The liquid slugs 207 may have (e.g., smaller) bubbles 208 dispersed therein, containing parts of the first portion 202 of the fluid.

Figure 4:
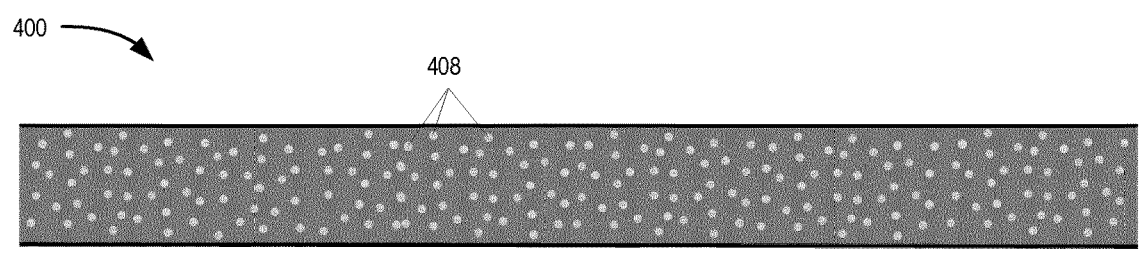
FIG. 4 illustrates a schematic view of a dispersed (e.g., bubbly) flow, according to an embodiment.
Figure 5:
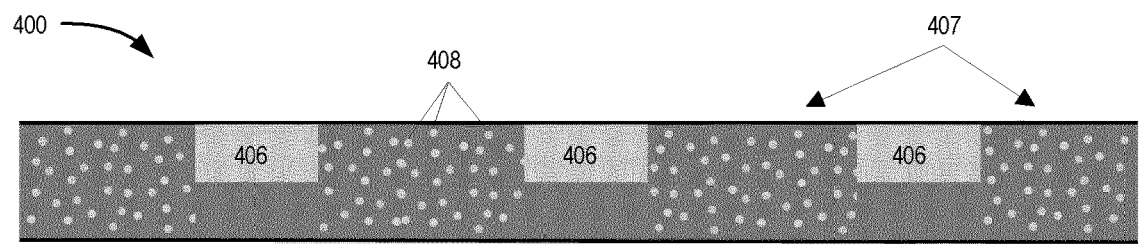
FIG. 5 illustrates a schematic view of slug bubbles added to the bubbly flow, according to an embodiment.

FIG. 4 illustrates a schematic view of a dispersed (e.g., bubbly) flow, according to an embodiment. FIG. 5 illustrates a schematic view of slug bubbles 406 added to the bubbly flow, according to an embodiment. In FIGS. 4 and 5, a conduit (e.g., a pipe) 400 has a fluid flowing therethrough. Unlike FIGS. 2 and 3, where the fluid is stratified, in FIGS. 4 and 5, the fluid may include a liquid with bubbles dispersed therein. The liquid may be or include water, hydrocarbons, carbon dioxide, or a combination thereof. The bubbles may be or include a gas such as hydrocarbons, steam, carbon dioxide, or a combination thereof In other embodiments, the bubbles may be or include an immiscible liquid of lower density. In FIG. 5, a transition to slug flow has occurred by the formation of new slug bubbles 406. The slug bubbles 406 may be separated from one another by liquid slugs 407, which may, as shown, have smaller bubbles 408 dispersed therein.

Figure 6:
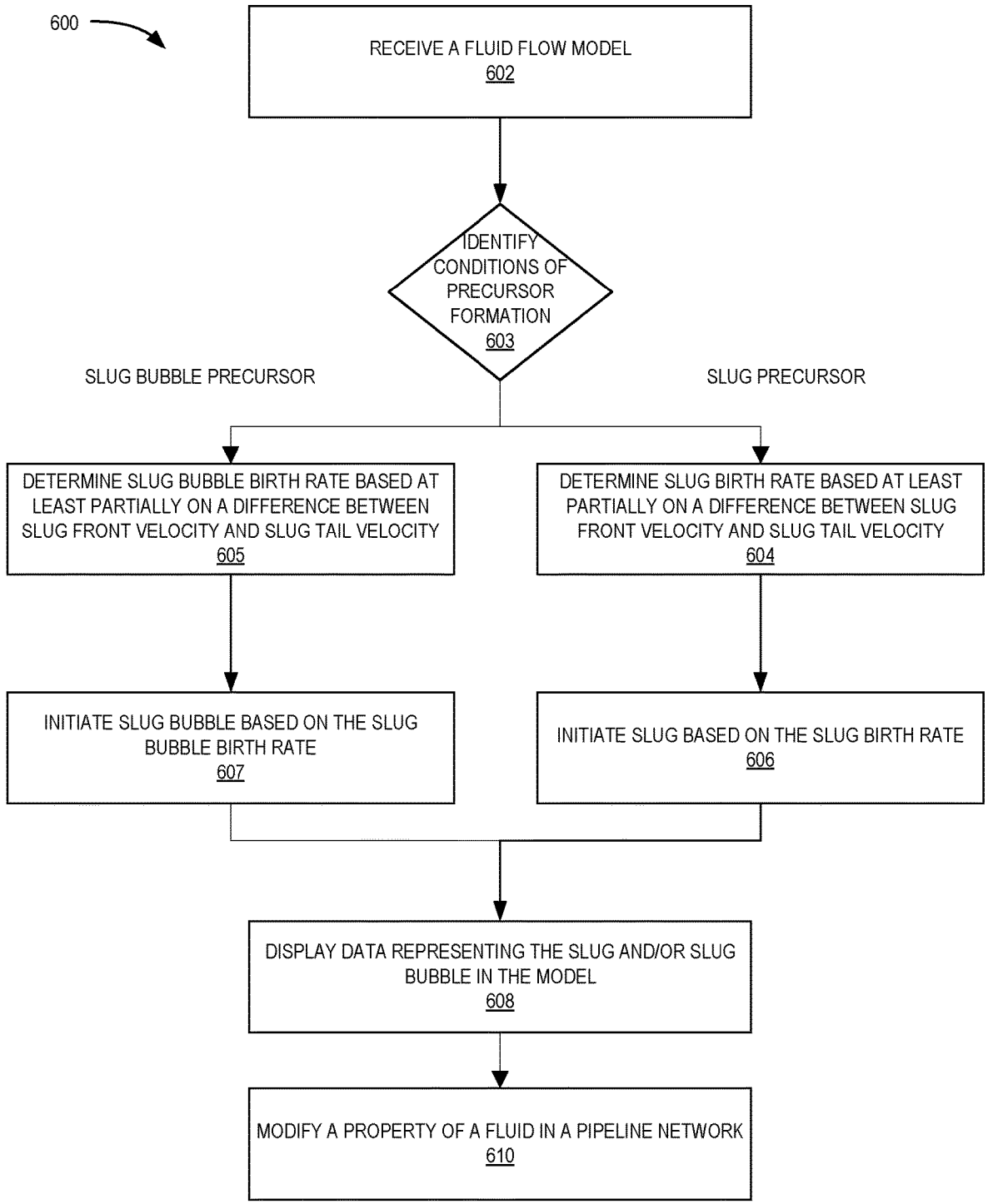
FIG. 6 illustrates a flowchart of a method for modeling slug flow (e.g., in a separated or dispersed) multiphase flow, according to an embodiment.

FIG. 6 illustrates a flowchart of a method 600 for modeling a slug flow (e.g., in a multiphase fluid flow model), according to an embodiment. The method 600 may be employed as part of a fluid flow or pipeline model. The model may include representations of one or more fluid conduits (e.g., pipes, wells) and/or other pipeline equipment (compressors, pumps, separators, slug catchers, etc.). Such models may be representative of real-world, physical pipeline systems, or may be constructed as part of the planning of such systems.

Accordingly, in some embodiments, the method 600 may include creating a fluid flow model, such as by using OLGA® or any other suitable pipeline modeling/simulation system. In another embodiment, the method 600 may include receiving a completed fluid flow model. Either case may be considered as part of receiving a fluid flow model, e.g., as at 602. The model makes use of data on the geometry of the pipeline, the physical properties of the gas and/or liquid(s) present, and the mass flow rates of the gas and/or liquids. The pipeline properties may be obtained from design information or by direct measurement (as-laid). The fluid properties may be obtained from a PVT simulator through knowledge of the fluid composition together with the temperature and pressure. The temperature and pressure may be known through direct measurement (e.g., using sensors positioned in or coupled to the pipeline), or may be inferred from a simulation. The mass flow rates may be specified by design, may be known by direct measurement (e.g., using sensors positioned in or coupled to the pipeline), or may be inferred from other calculations.

As indicated, the model may include a representation of one or more conduits, as well as a flow of multiphase fluid therein. The conduits may be modeled according to geometry (e.g., diameter, length, etc.), pressure change, elevation gain, heat transfer, and/or the like. For the remainder of the present description, the model is described in terms of "pipes"; however, it will be readily apparent that the disclosure is not limited to pipes and may apply to any type of fluid conduit. In an embodiment, the multiphase fluid flow may be modeled based on the parameters of the pipes (and/or other equipment), as well as the underlying equations of mass, state, energy, etc.

The method 600 may also include identifying conditions of a precursor formation, as at 603. As used herein, a "precursor formation" refers to the appearance of a short slug in a region where the flow was separated, for example, by the growth of an interfacial wave to such an amplitude that it fills the pipe cross-section, or to the appearance of a short slug bubble in a region where the flow was dispersed, for example, by the coalescence of many small bubbles to form a single large bubble. The precursor formation may be or include a slug precursor formation or a slug bubble precursor formation. A first one of such conditions may be known as a "minimum slip criterion." The minimum slip criterion determines if a slug flow is to be created, and if so, the minimum slip criterion also determines whether slug flow grows out of slug precursors or slug bubble precursors.

If conditions of a slug precursor formation are identified, the method 600 may proceed to determining a birth rate of slug precursors in the multiphase fluid flow, as at 604. If, however, conditions of a slug bubble precursor formation are identified, the method 600 may proceed to determining a birth rate of slug bubble precursors in the multiphase fluid flow, as at 605. The birth rate may be determined based on one or more of a variety of factors, which may be provided as part of a birth rate model. The birth rate, generally referred to as 'B' herein, may thus represent the number of new precursors of slugs or slug bubbles per length of pipe per second.

The birth rate may be zero unless conditions exist that allow either slugs or slug bubbles to form. A first one of such conditions may be known as a "minimum slip criterion," "slug growth criterion," or "slug bubble growth criterion." More particularly, in an embodiment, the minimum slip criterion may be satisfied if, were a slug or slug bubble to be introduced into the flow, the velocity of the slug front $V_F$ would exceed or not the velocity of the slug tail $V_T$ (i.e., $V_F-V_T>0$ or $V_F-V_T<0$). The difference between $V_F$ and $V_T$ may represent a mean growth rate of slugs or slug bubbles, and may also be representative of a distance from the minimum slip boundary, or the degree of instability of the local separated flow or bubbly flow. Accordingly, the value of the difference may represent a driving force, and thus an increasing probability, for new slugs or new slug bubbles to form, as will be described below. For a slug or slug bubble to be counted (e.g., in the determination of N, below) it may have a length of at least the pipe diameter D. Thus, the time for a slug or slug bubble to form may scale as $D/|V_F-V_T|$, and the rate at which new slugs or slug bubbles form may scale as $|V_F-V_T|/D$.

To determine the slug tail velocity $V_T$, a correlation for slug tail velocity $V_T$ may be implemented in terms of mixture velocity $u_M$, gravity g, pipe diameter D, inclination angle above the horizontal θ, and/or other quantities. Accordingly, slug tail velocity $V_T$ may be defined as:

$$V_T = f(u_M, g, D, \theta, \dots) \tag{1}$$

The slug front velocity $V_F$ may be given by a mass balance across the slug front:

$$(V_F - u_{GS}^F)\alpha_{GS}^F = (V_F - u_{GB}^T)\alpha_{GB}^T \tag{2}$$

Solving equation (2) for $V_F$:

$$V_F = \frac{\alpha_{GB}^T u_{GB}^T - \alpha_{GS}^F u_{GS}^F}{\alpha_{GB}^T - \alpha_{GS}^F} \tag{3}$$

where $\alpha_{GS}^F$ and $u_{GS}^F$ represent the cross-sectional holdup and cross-sectional mean velocity of gas within the front of the slug, respectively, and $\alpha_{GB}^T$ and $u_{GB}^T$ represent the same quantities within the tail of the zone of separated flow immediately ahead of the slug. Further, equations (2) and (3) may be evaluated when slugs are not present. In such case, values for $\alpha_{GS}^F$ and $u_{GS}^F$ may be provided (e.g., as hypothetical values), while $\alpha_{GB}^T$ and $u_{GB}^T$ may take values corresponding to the separated flow. In a similar way, equations (2) and (3) may be evaluated when slug bubbles are not present. In such case, values for $\alpha_{GS}^F$ and $u_{GS}^F$ may take values corresponding to the bubbly flow, while $\alpha_{GB}^T$ and $u_{GB}^T$ may be provided (e.g., as hypothetical values).

When the minimum slip criterion (first condition) is satisfied, it may indicate that slugs may grow from slug precursors, if such precursors are available (second condition). The spatial frequency of slug formation may thus be proportional to the number of large waves (or slug precursors) per unit pipe length $N_W$. However, the presence (or proximity) of slugs may decrease the subsequent formation of slugs, and thus the slug birth rate B, as at 604, may take into consideration slugs that have already formed. Accordingly, the second condition that may be satisfied in order for slug precursors to form may be that the density of slugs present in the pipe N (slugs per unit length of pipe) may not exceed the density of large wave slug precursors (i.e., $N_W - N > 0$).

In another embodiment, when the minimum slip criterion (first condition) is satisfied, it may indicate that slug flow forms from slug bubble precursors, if such precursors are available (second condition). The spatial frequency of slug bubble formation may thus be proportional to the number of slug bubble precursors per unit pipe length $N_B$. However, the presence (or proximity) of slug bubbles may decrease the subsequent formation of slug bubbles, and thus the slug bubble birth rate B, as at 605, may take into consideration slug bubbles that have already formed. Accordingly, the second condition that may be satisfied in order for slug bubble precursors to form may be that the density of slug bubbles present in the pipe N (slug bubbles per unit length of pipe) may not exceed the density of slug bubble precursors (i.e., $N_B - N > 0$).

To determine the number of slug precursors or large waves, a delay constant may be implemented. As such, the density of large wave slug precursors $N_W$ may be estimated, as $N_W = u_L/(V_T \Omega D)$, where $\Omega$ is the delay constant and $u_L$ is the local mean liquid velocity. In another embodiment, a mechanistic model for slug initiation frequency may be employed. For example, at the threshold of slug formation, the wave profile may be considered to be similar to the tail profile of an incipient slug, and the wave speed may approach the slug tail velocity. As such, the wavelength of the slug may be estimated using a quasi-steady slug tail profile model. The local slug density N at a particular grid point or control volume may be estimated based on the distances to the nearest slugs (if any) in each direction along the pipeline. If no slugs exist in either direction, then the slug density is zero.

Similarly, to determine the number of slug bubble precursors, a delay constant may be implemented. As such, the density of slug bubble precursors $N_B$ may be estimated, as $N_B = u_M/(V_T \Omega D)$, where $\Omega$ is the delay constant and $u_M$ is the local mixture velocity. In another embodiment, a mechanistic model for slug bubble initiation frequency may be employed. For example, at the threshold of slug bubble formation, the holdup profile behind a slug tail may be considered to be similar to the tail profile of a developed slug, and the slug bubble propagation speed may approach the slug tail velocity. As such, the holdup of the slug bubble may be estimated using a quasi-steady slug tail profile model. The local slug bubble density N at a particular grid point or control volume may be estimated based on the distances to the nearest slug bubbles (if any) in each direction along the pipeline. If no slug bubbles exist in either direction, then the slug bubble density is zero.

In an embodiment, the slug tail profile may be obtained by solving a first order, ordinary differential equation for liquid holdup $\alpha_{LW}(\xi)$, $$\frac{d\alpha_{LW}}{d\xi} = \frac{Z}{Y} \quad (4)$$

This may represent a reduced form of a steady-state, two- (or more) fluid model, which may be based at least in part on an assumption that the flow in a slug bubble may be considered quasi-steady in a frame of reference moving with the slug tail speed. In equation (4), $\xi$ represents the spatial coordinate measured backwards from the wave crest (tail of the slug). In the two-fluid model, Z represents the equilibrium terms: friction and the axial component of gravity, which in the case where the separated flow is stratified are according to equation (5):

$$Z = \frac{\tau_{IW} S_{IW} - \tau_{LW} S_{LW}}{\alpha_{LW} A} + \frac{\tau_{IW} S_{IW} + \tau_{GW} S_{GW}}{(1 - \alpha_{LW}) A} - (\rho_L - \rho_G) g \sin\theta \quad (5)$$

The denominator Y in equation (4) may represent one or more non-equilibrium terms, such as inertial and hydraulic gradient terms, which, for stratified flow, may be:

$$Y = \rho_L \frac{\hat{u}_{SL}^2}{\alpha_{LW}^3} + \rho_G \frac{\hat{u}_{SG}^2}{(1 - \alpha_{LW})^3} - (\rho_L - \rho_G) g \cos\theta \frac{A}{S_{IW}} \quad (6)$$

The terms $\tau_{IW}$, $\tau_{LW}$, and $\tau_{GW}$ represent the shear stresses between the gas and liquid, between the liquid and the pipe wall, and between the gas and the pipe wall, respectively, while $S_{IW}$, $S_{LW}$, and $S_{GW}$ represent the corresponding perimeter lengths, and the subscript 'W' denotes "wave" (or slug tail). A is the pipe cross-sectional area, $\hat{u}_{SL}$ and $\hat{u}_{SG}$ are the superficial velocities of liquid and gas, respectively, relative to the moving frame of reference, $\rho_L$ and $\rho_G$ are the liquid and gas densities, respectively, g is the acceleration of gravity and $\theta$ represents the angle of inclination of the pipe above the horizontal.

The mean holdup may be determined by integration over the slug tail profile:

$$\overline{\alpha_{LW}} = \frac{1}{L_W} \int_0^{L_W} \alpha_{LW}(\xi) d\xi \quad (7)$$

where $L_W$ is the distance between the tail of one slug and the front of the next.

Further, the slug length of the slug precursor may be set to zero, or any other value, for example a length of a few diameters, in order to determine the frequency of slug precursors. Moreover, an approximate solution may be introduced for the wave profile in the exponential form, as equation (8):

$$\alpha_{LW} \approx \tilde{\alpha}_{LW}(\xi) = \alpha_{LW}^E + (\alpha_{LW}^0 - \alpha_{LW}^E) e^{-k\xi} \quad (8)$$

where $\alpha_{LW}^E$ is a hypothetical equilibrium holdup achieved for a very long wave tail, $\xi \to \infty$, $Z \to 0$, and $\alpha_{LW}^0$ is the hold up at the wave crest (slug tail), which may be set equal to the slug body holdup of the incipient slug. When the void in the slug is neglected, $\alpha_{LW}^0$ may be set to unity. As such, the mean holdup value of the liquid corresponding to the approximate profile may be:

$$\overline{\alpha_{LW}} \approx \alpha_{LW}^E + (\alpha_{LW}^0 - \alpha_{LW}^E)\frac{1}{kL_W}(1 - e^{-kL_W}) \qquad (9)$$

In an embodiment, the product $KL_W$ may be about three (or another, moderately large number), so that the stratified zone is long enough for the liquid level to approach the equilibrium value and the exponential term in equation (9) may be neglected. In such a case, $L_W$ may be determined from:

$$L_W \approx \frac{1}{k}\frac{\alpha_{LW}^0 - \alpha_{LW}^E}{\overline{\alpha_{LW}} - \alpha_{LW}^E} \qquad (10)$$

To estimate the value of k, the spatial derivative of the exponential profile may be given as:

$$\frac{d\tilde{\alpha}_{LW}}{d\xi} = -k(\alpha_{LW}^0 - \alpha_{LW}^E)e^{-k\xi} = -k(\tilde{\alpha}_{LW} - \alpha_{LW}^E) \qquad (11)$$

so that a value of the exponential coefficient k may be estimated from $$k \approx k^R = -\left[\frac{1}{\alpha_{LW} - \alpha_{LW}^E}\frac{d\alpha_{LW}}{d\xi}\right]_{\alpha_{LW}=\alpha_{LW}^R} = \frac{-1}{\alpha_{LW}^R - \alpha_{LW}^E}\left[\frac{Z}{Y}\right]_{\alpha_{LW}=\alpha_{LW}^R} \qquad (12)$$

Here, $\alpha_{LW}^R$ may be a reference value of the holdup taken at a point along the profile. In an embodiment, the value of $\alpha_{LW}^R$ may be selected such that the half-angle $\delta$ subtended by the liquid layer at the pipe center is between the equilibrium value $\delta^E$ and the value of the slug tail $\delta^0$, weighted by a fraction $c_K$:

$$\delta^R = \delta^E + c_K(\delta^0 - \delta^E) \qquad (13)$$

The fraction $c_K$ may serve as a tuning variable in the model. The value may be predetermined or received, e.g., from a user, as part of the method 600. For example, the fraction may be set as 0.18, but in other embodiments, may be any other suitable number. The holdup may be given in terms of the half angle $\delta$ by $\alpha_{LW}=(\delta - \cos\delta\sin\delta)/\pi$.

An estimate for the number of precursor waves per unit length may thus be:

$$N_W \approx c_W \frac{\overline{\alpha_{LW}} - \alpha_{LW}^E}{(\alpha_{LW}^0 - \alpha_{LW}^E)(\alpha_{LW}^R - \alpha_{LW}^E)}\left[\frac{-Z}{Y}\right]_{\alpha_{LW}=\alpha_{LW}^R} \qquad (14)$$

where $c_W$ may be a free tuning parameter, which may be set, for example, as 1.

When the wave propagates without change of form, the liquid flux relative to the moving frame of reference may be constant along the wave profile, such that:

$$\alpha_{LW}\hat{u}_{LW} \approx \hat{u}_{SL} \qquad (15)$$

where $\hat{u}_{LW}=V_W-u_{LW}$ the liquid velocity (measured backwards) relative to the wave crest (slug tail) and $\hat{u}_{SL}=V_W-u_{SL}$ is the corresponding superficial velocity. Continuity of liquid holdup and flux across the slug tail may give $\alpha_{LW}^0=\alpha_{LS}^T$ and $\hat{u}_{SL}=(V_W-u_{LS}^T)\alpha_{LS}^T$, where $\alpha_{LS}^T$ and $u_{LS}^T$ are the holdup and velocity of liquid, respectively, at the tail of the slug precursor (e.g., the crest of the wave). In some embodiments, gas entrainment may be ignored, and $\alpha_{LS}^T \approx 1$, $\delta^0 = \pi$, and $u_{LS}^T = u_M$, such that $\hat{u}_{SL} \approx V_W - u_M$, where $u_M$ is a local mixture velocity.

The mean liquid flux in the wave may be determined as:

$$q_L = \alpha_L\mu_L = \frac{1}{L_W}\int_0^{L_W}\alpha_{LW}(\xi)\mu_{LW}(\xi)d\xi \qquad (16)$$

Further, as $u_{LW}=V_W-\hat{u}_{SL}/\alpha_{LW}$, liquid flux becomes:

$$q_L = \frac{1}{L_W}\int_0^{L_W}(V_W\alpha_{LW} - \hat{u}_{SL})d\xi = V_W\overline{\alpha_{LW}} - \hat{u}_{SL} \qquad (17)$$

yielding:

$$V_W = \frac{u_M - q_L}{1 - \overline{\alpha_{LW}}} = u_G \qquad (18)$$

in which $u_G$ is the mean gas velocity

For a developing flow, the liquid holdup $\alpha_L$ and the flux $q_L$ may be determined independently. As such, the wave velocity $V_W$, which may be equal to the gas velocity $u_G$ in the case with no gas entrainment, may differ from the slug tail velocity $V_T$. This potential inconsistency may be resolved in at least two ways. First, in a steady flow, the wave velocity may be equal to the slug tail velocity, $V_W=V_T$, which may be regarded as an approximation for unsteady flow. In such case, the wave model may take $\overline{\alpha_{LW}}$ to be the local value of $\alpha_L$ (and may not use the liquid flux $q_L$). Second, a local value for the liquid flux $q_L$ may be determined, and equation (18) may be employed to obtain an adjusted value for the mean holdup corresponding to the wavy flow:

$$\overline{\alpha_{LW}} = 1 - \frac{u_M - q_L}{V_T} \qquad (19)$$

In this case, the wave model may use a liquid holdup value $\overline{\alpha_{LW}}$ corresponding to the local value of $q_L$ (and may not use $\alpha_L$).

In some embodiments, determining a slug death rate may be omitted, as a slug may simply be considered to be dead with its characteristic length $L_S$ approaches zero. In other embodiments, a slug death rate may be determined. If slugs are present, and the slug tail velocity $V_T$ is greater than the slug front velocity $V_F$, the slugs may decrease in length. The mean front and tail velocity of relatively short slugs may be considered generally constant, thus the model may neglect slugs for which the tail velocity differs from the standard form. Thus, the rate at which the slugs disappear may be proportional to $(V_T-V_F)\psi(0)$. The function $\psi(L_S)$ represents the probability density function of slugs of length $L_S$, and $\psi(0)$ represents the probability density of slugs of zero (or substantially zero) length. In some embodiments, $\psi(0)$ may be proportional to $N/L_S$ thus the death rate may be estimated by $$D = c_D \frac{N(V_T - V_F)}{\overline{L_S}}, V_T > V_F \qquad (20)$$

where $c_D$ is another dimensionless constant that may be tuned to data. Further, to avoid a potential singularity when $\overline{L_S} \to 0$, an upper bound may be imposed for the slug death rate D by adding a constant to the denominator, such as the pipe diameter, thereby yielding:

$$D = c_D \frac{N(V_T - V_F)}{\overline{L_S} + D}, V_T > V_F \qquad (21)$$

In some embodiments, the death of slug bubbles may be treated in a precisely analogous manner.

In an embodiment, if both of the first condition (minimum slip criterion) and second conditions (available precursors) are satisfied, the slug birth rate B may be determined according to the following equation:

$$B = \frac{c_B}{D}(N_W - N)(V_F - V_T) \qquad (22)$$

In equation (22), D represents the pipe diameter, and $c_B$ is a constant of proportionality that is determined by matching the model with experimental data and/or field data. The birth rate model gives the birth rate B in terms of at least two factors, which represent the degree of instability of the local stratified flow, and the spatial density of slug precursors (slugs/meter).

The length ($L_W$) of the slug bubble precursor may be set to zero, or any other value, for example a length of a few diameters, in order to determine the frequency of slug bubble precursors. The distance between two slug bubble precursors may be determined according to the following equation:

$$L_S = \frac{L_W(\overline{\alpha_{LW}} - \overline{\alpha})}{\overline{\alpha} - \alpha_S} \qquad (23)$$

The slug bubble density is then $$N_B = \frac{1}{L_W + L_S} \qquad (24)$$

The birth rate of slug bubble precursor may be determined by the following equation $$B = \frac{c_{bB}}{D}(N_B - N)(V_T - V_F) \qquad (25)$$

After the slug birth rate is determined, the method 600 may then proceed to initiating a slug flow in the fluid flow model based at least partially on the slug birth rate, as at 606. In another embodiment, after the slug bubble birth rate is determined, the method 600 may then proceed to initiating a slug bubble flow in the fluid flow model based at least partially on the slug bubble birth rate, as at 607. Initiating slug flow or slug bubble flow may be conducted according to a population equation, which may employ the birth rate and/or death rate calculated above. An example of such a population equation may be as follows:

$$\frac{\partial N}{\partial t} + \frac{\partial}{\partial x}(NU_A) = B - D \qquad (26)$$

where N is the number of slugs per unit pipe length, $U_A$ is the advection velocity, B is the slug birth rate, and D is the slug death rate. In some embodiments, as mentioned above, a model for slug death may be omitted; as length approaches zero, the slug may be considered dead.

In an embodiment, the simulation of the fluid flow model may proceed according to time periods $\Delta t$, where the equations describing the state of the cells or control volumes (e.g., lengths of pipe) of the model are resolved after one, some, or each time period. Further, the number of new slugs formed may be generally described in terms of the birth rate B, the control volume length $\Delta z$ and the time period $\Delta t$ as:

$$\Delta N = B \, \Delta z \, \Delta t. \qquad (27)$$

However, the pipe length $\Delta z$ and/or the time period $\Delta t$ may be relatively short, such that $\Delta N$ is generally less than one and greater than or equal to zero. Accordingly, embodiments of the present method 600 may employ the $\Delta N$ value as a probability. For example, the method 600 may include generating a random or pseudo-random number X, which may be uniformly distributed on the interval [0, 1]. When $\Delta N > X$, a slug may be initiated, and if $\Delta N < X$, a slug may not be initiated.

When one or more slug flows at one or more lengths of pipe, at a time period, are resolved, the method 600 may include displaying data representative of the slug flow, as at 608. This may take any one or more of a variety of forms and may result in a representation of an underlying object changing, based on the simulation. For example, one or more slugs may be graphically represented in a pipe. In another embodiment, a frequency of slug flow, e.g., as a plot, may be created and/or modified according to the method 600. In another embodiment, a slug length distribution, e.g., as a plot, may be created and/or modified according to the method 600. In other embodiments, other types of graphical displays based on data from the underlying actual or hypothetical physical pipeline system may be provided.

In a design study, the user may choose to modify or optimize the design taking account of the data from the slug flow simulation. In an operational scenario, the user may choose to adjust control settings to modify or optimize the flow in the pipeline network, as at 610. For example, in response to initiating the slug (at 606) or the slug bubble (at 607), the user may modify one or more properties (e.g., flow rate, the pressure, the temperature, the viscosity, etc.) of the fluid, or may modify one or more of the control settings (e.g., valves, actuators, etc.) in the physical, real-world pipeline network, as opposed to the model. Modifying the flow may be performed directly by the user, or automatically by a computer system designed for that purpose.

Figure 7A:
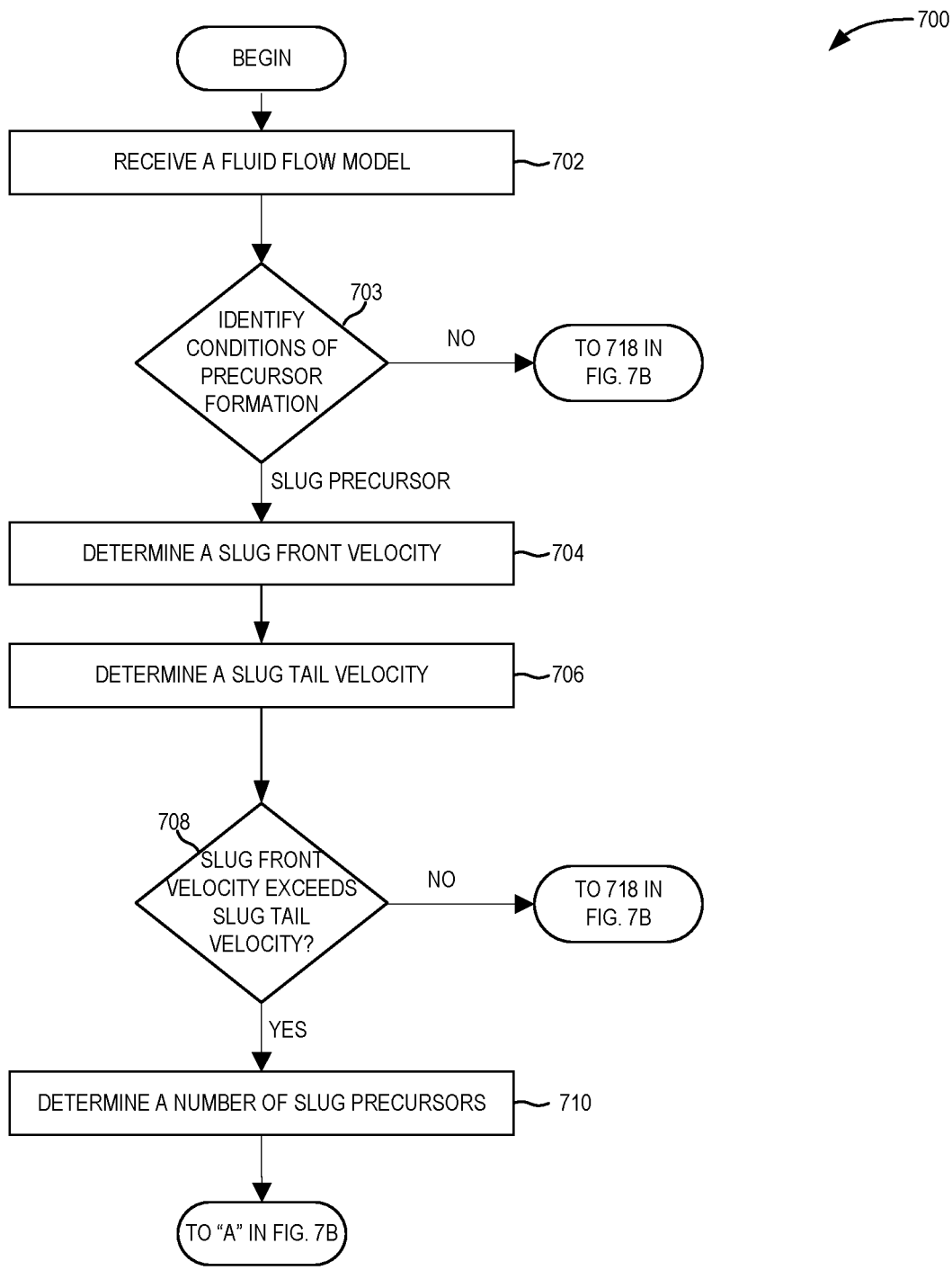
FIGS. 7A and 7B illustrate another flowchart of a method for modeling slug flow in a separated multiphase flow, according to an embodiment.
Figure 7B:
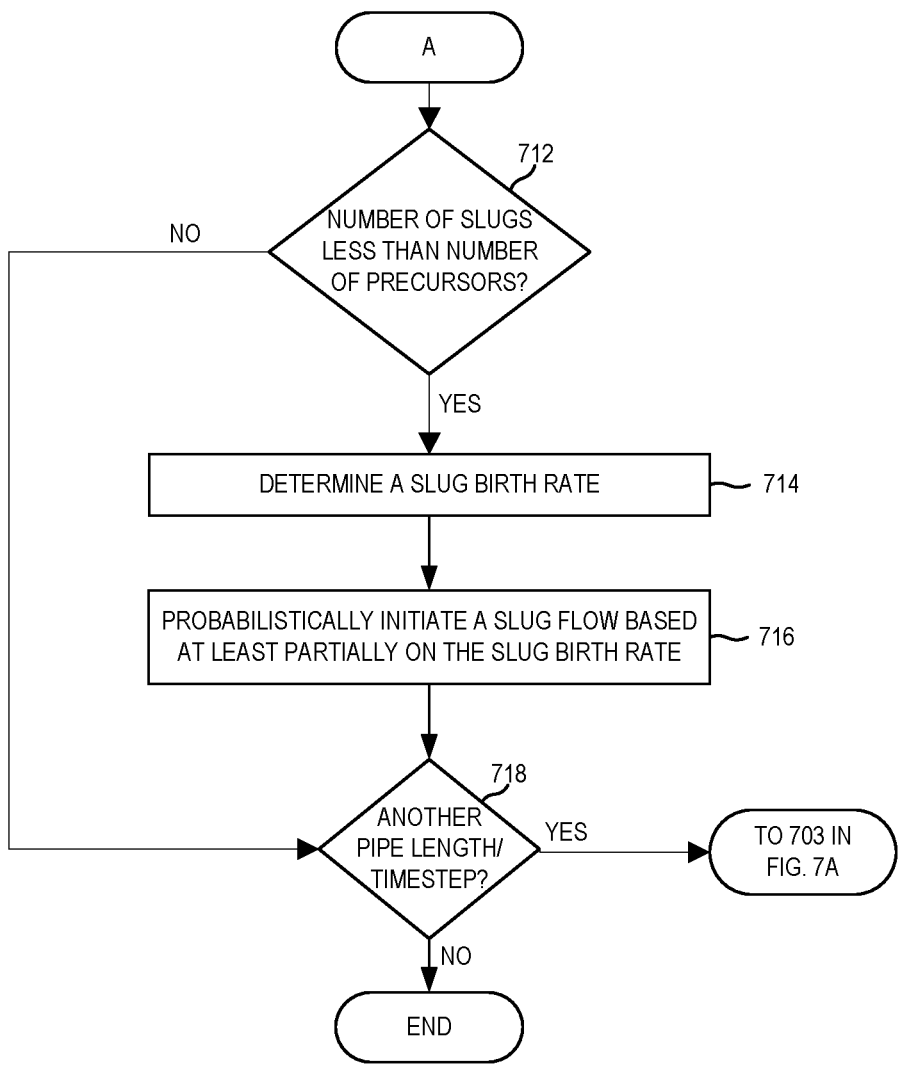

FIGS. 7A and 7B illustrate a flowchart of a method 700 for modeling slug flow in a separated, multiphase flow, according to an embodiment. In an embodiment, the method 700 may be a more detailed view of a portion of the method 600 of FIG. 6, which may employ one or more of the calculation techniques described above. In other embodiments, however, the method 700 may proceed using different calculation techniques.

In an embodiment, the method 700 may begin by receiving a fluid flow model, as at 702. The fluid flow model may be or include a model of a system of fluid conduits (e.g., pipes and/or other structures) through which flow is transported. The flow may be multiphase, meaning that it contains two or more phases selected from the group including of a gas, a liquid, and a number of other immiscible liquids. The method 700 may receive the fluid flow model as already complete or may include constructing at least a portion of the model. After the model is received, the method 700 may include identifying conditions of a precursor formation, as at 703. This may include determining whether slugs grow from slug precursors.

The method 700 may include conducting one or more aspects iteratively, e.g., as part of a sequence that may be based upon time periods in a simulation using the model. The time periods may be set at any time value. Accordingly, the method 700 may generally proceed by making calculations and updating the model after a certain amount of time passes in the model.

As part of such an iterative sequence, for example, the method 700 may include determining a slug front velocity for the multiphase flow in one, some, or each section of the pipe, for the time period, as at 704. The slug front velocity $V_F$ may be determined as generally described above. Further, the method 700 may include determining a slug tail velocity $V_T$, as at 706, again as generally described above.

The method 700 may then determine whether the slug front velocity exceeds the slug tail velocity, as at 708. For example, the method 700 at 708 may include determining whether the minimum slip criterion is met. If it is not, the method 700 may move to the next time period (or to a next length of pipe, etc.). When the determination at 708 is 'YES', the method 700 may proceed to determining a number of slug precursors $N_W$, as at 710. In an embodiment, this may be conducted as described above.

The method 700 may then determine whether the number (density) of slugs N is less than the number (density) of slug precursors $N_W$, as at 712. If the number of slugs N is greater than the number of slug precursors $N_W$ (e.g., the determination at 712 is 'NO'), the method 700 may determine that the second condition is not met, and thus no slugs will be initiated at this time period, at this pipe length, and may thus move to the next pipe length or time period. On the other hand, if the number of slugs N is not greater than the number of slug precursors (e.g., the determination at 712 is 'YES'), the method 700 may continue to determining a slug birth rate, as at 714. The slug birth rate B model may be determined as described above, for example.

The method 700 may then probabilistically initiate a slug based at least partially on the birth rate B, e.g., at least partially on the difference between the slug front velocity and the slug tail velocity, as at 716. For example, the greater the birth rate and/or the greater the difference between the front and tail velocities, the higher the likelihood of a slug initiation. However, slug initiation, even in high-probability situations, may not be a certainty. Thus, in some cases, such probabilistic initiation may not actually result in a slug being initiated, but in others, it may.

Whether a slug is initiated or not, the method 700 may, in some embodiments, determine whether to proceed to another round of analysis, e.g., at another pipe length and/or another time period, as at 718. If no further analysis occurs, the method 700 may terminate (and control may be passed, e.g., to other methods). If analysis at another pipe length or time period is desired, the method 700 may loop back to 704. If a time period is advanced, the fluid flow model may thus be updated, such that new values for the slug front velocity and slug tail velocity, among other things, may be calculated for a given length of pipe.

Figure 8A:
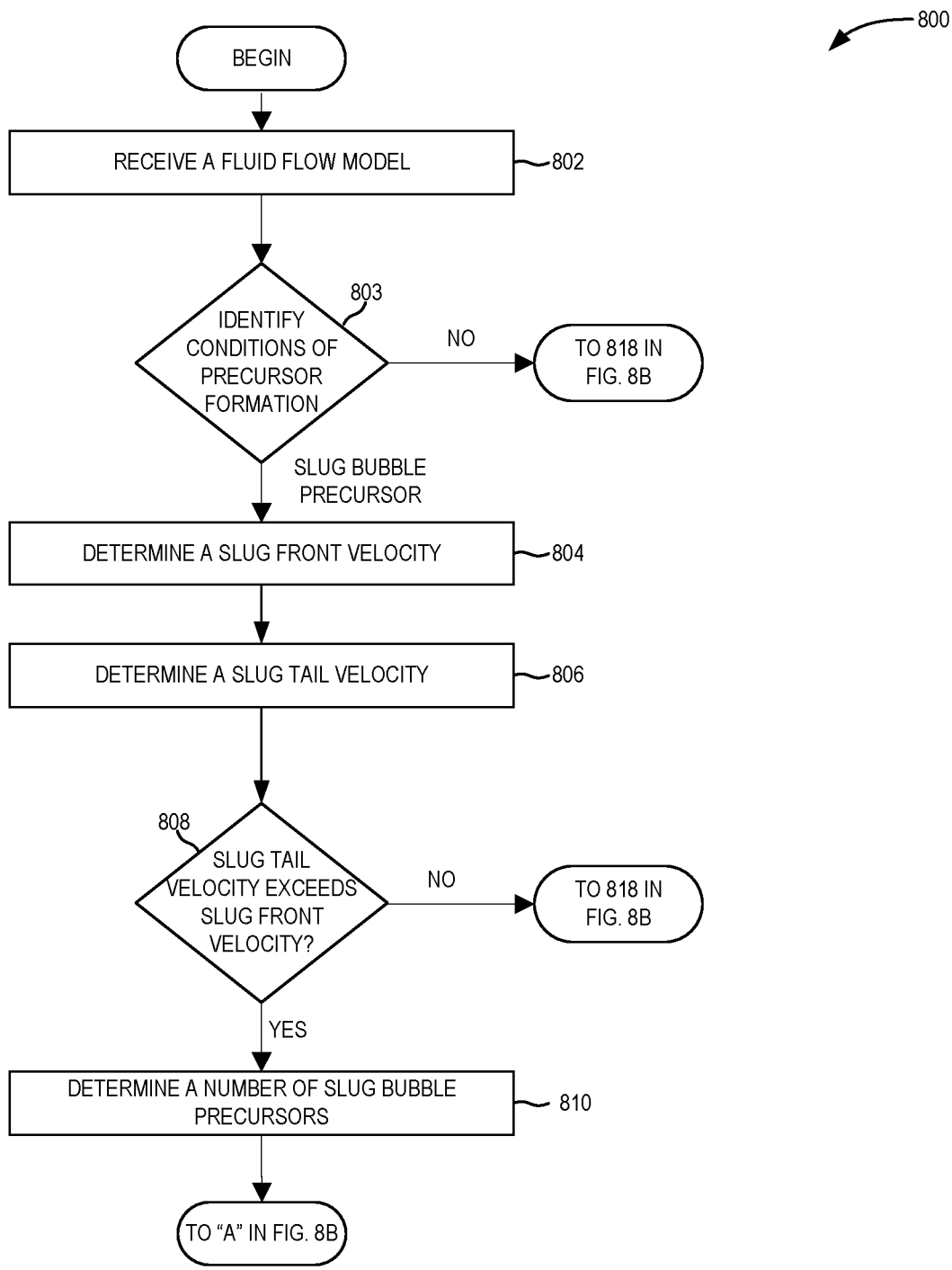
FIGS. 8A and 8B illustrate another flowchart of a method for modeling slug flow in a dispersed multiphase flow, according to an embodiment.
Figure 8B:
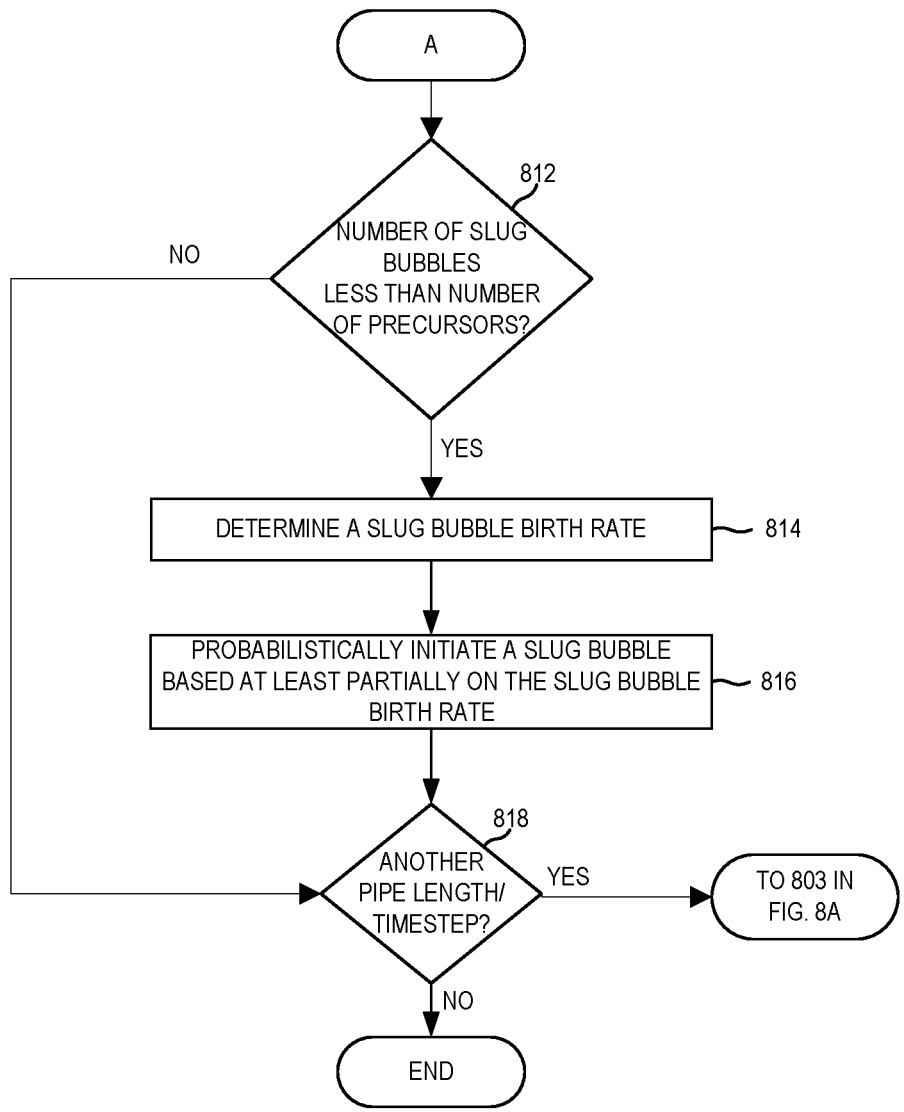

FIGS. 8A and 8B illustrate a flowchart of a method 800 for modeling slug flow in a dispersed (e.g., bubbly) multiphase flow, according to an embodiment. In an embodiment, the method 800 may be a more detailed view of a portion of the method 600 of FIG. 6, which may employ one or more of the calculation techniques described above. In other embodiments, however, the method 800 may proceed using different calculation techniques.

The model for slug initiation generated by the method 700 applies to the transition from separated (e.g., stratified or annular) flow to slug flow. This is achieved in simulations by the introduction of short slugs. The model may be extended so that it applies to the transition from a dispersed (e.g., bubbly) flow to slug flow, as described by the method 800.

In an embodiment, the method 800 may begin by receiving a fluid flow model, as at 802, e.g., a model of a system of fluid conduits (e.g., pipes and/or other structures) through which flow is transported. The method 800 may receive the fluid flow model as already complete or may include constructing at least a portion of the model. After the model is received, the method 800 may include identifying conditions of a precursor formation, as at 803. This may include determining whether slugs grow from slug bubble precursors.

The method 800 may include conducting one or more aspects iteratively, e.g., as part of a sequence that may be based upon time periods in a simulation using the model. The time periods may be set at any time value. Accordingly, the method 800 may generally proceed by making calculations and updating the model after a certain amount of time passes in the model.

As part of such an iterative sequence, for example, the method 800 may include determining a slug front velocity for the multiphase flow in one, some, or each section of the pipe, for the time period, as at 804. The slug front velocity $V_F$ may be determined as generally described above. Further, the method 800 may include determining a slug tail velocity $V_T$, as at 806, again as generally described above.

The method 800 may then determine whether the slug tail velocity exceeds the slug front velocity, as at 808. For example, the method 800 at 808 may include determining whether the minimum slip criterion is met. If it is not, the method 800 may move to the next time period (or to a next length of pipe, etc.). When the determination at 808 is 'YES', the method 800 may proceed to determining a number of slug bubble precursors $N_B$, as at 810. In an embodiment, this may be conducted as described above.

The method 800 may then determine whether the number (density) of slug bubbles N is less than the number (density) of slug bubble precursors $N_B$, as at 812. If the number of slug bubbles N is greater than the number of slug bubble precursors $N_B$ (e.g., the determination at 812 is 'NO'), the method 800 may determine that the second condition is not met, and thus no slug bubbles will be initiated at this time period, at this pipe length, and may thus move to the next pipe length or time period. On the other hand, if the number of slug bubbles N is not greater than the number of slug bubble precursors (e.g., the determination at 812 is 'YES'), the method 800 may continue to determining a slug bubble birth rate, as at 814. The slug bubble birth rate B model may be determined as described above, for example.

The method 800 may then probabilistically initiate a slug bubble based at least partially on the birth rate B, e.g., at least partially on the difference between the slug front velocity and the slug tail velocity, as at 816. For example, the greater the birth rate and/or the greater the difference between the front and tail velocities, the higher the likelihood of a slug initiation. However, slug bubble initiation, even in high-probability situations, may not be a certainty. Thus, in some cases, such probabilistic initiation may not actually result in a slug bubble being initiated, but in others, it may.

Whether a slug bubble is initiated or not, the method 800 may, in some embodiments, determine whether to proceed to another round of analysis, e.g., at another pipe length and/or another time period, as at 818. If no further analysis occurs, the method 800 may terminate (and control may be passed, e.g., to other methods). If analysis at another pipe length or time period is desired, the method 800 may loop back to 804. If a time period is advanced, the fluid flow model may thus be updated, such that new values for the slug front velocity and slug tail velocity, among other things, may be calculated for a given length of pipe.

The methods 600, 700, 800 provided herein may improve existing computer technologies and provide improvements to a technology or technical field, namely modeling slug flow. More particularly, the methods 600, 700, 800 may reduce the amount of computing resources and time needed to model slug flow. In addition, the methods 600, 700, 800 may improve accuracy, stability, and tuning to match experimental or measured datasets by using an iterative process. Any such improvements in speed, accuracy, stability, and/or tunability may lead to consequent improvements in the design, operation, and optimization of multiphase flow in pipelines and pipeline networks, such as in the production of hydrocarbon energy fluids.

As discussed above, the method 800 may include (1) a criterion that determines when and where it is appropriate to introduce a new slug bubble into a simulation; (2) a model for the birth rate of new slug bubbles, which is used to determine a probability that a new slug bubble will be generated in a given pipe section at a given time period; (3) a model for the spatial number density or temporal frequency of slug bubble precursors; and (4) programming logic that manages the introduction of a new slug bubble in a simulation.

Original Model for Initiation of Short Slugs

The model may based on a conservation equation for the number of slugs:

$$\frac{\partial N}{\partial t} + \frac{\partial}{\partial x}(NU_A) = B \tag{28}$$

In equation (28), N represents the density of slugs in the pipeline (1/m), $U_A$ represents the advection velocity (i.e., average velocity with which slugs move through the pipeline), B represents the net birth rate of short slugs (1/m/sec), which is assumed to depend on the degree of instability in the system and the spatial density of slug precursors $N_P$ (1/m). The slug precursor density $N_P=1/L_{UC,P}$ is obtained by simulating the unit cell length $L_{UC,P}$ of successive short slugs of specified length (e.g., $L_{S,P}$=10 diameters). To this end, a two-phase tail profile model may be applied to compute the holdup distribution in the slug bubble zone.

The introduction of slugs may be governed by the slug growth criterion, also known as the minimum slip criterion. This criterion can be expressed in terms of the front ($V^F$) and tail ($V^T$) velocities of a candidate slug. If the flow is locally separated, the introduction of a candidate slug may be considered, and its front and tail velocity may be calculated. If $V^F<V^T$, the slug will quickly die, so a new slug should not be introduced. On the other hand, if $V^F>V^T$, the slug will grow, so a slug may be introduced. In the latter case, the decision whether to introduce a slug or not may be based on an estimate of the probability of slug formation. The birth rate B is modelled in the form $$B = k_{B,sep}(N_P - N)\frac{V^F - V^T}{10D} \tag{29}$$

Where $k_{B,sep}$ is a tuning constant. The final factor represents the (inverse) time for a slug to grow to a length of 10 times the pipe diameter D. Then, for a control volume of length $\Delta_Z$ and a time interval $\Delta_t$, the probability of a new slug being formed is P=B $\Delta_z$ $\Delta_t$. The time period may be small, so that P<<1.

"Square Bubble" Version of the Model

The slug precursor frequency Np may be determined from the unit cell length of successive short slugs, based on a two-phase tail profile model, in which the gradual reduction in liquid level behind the slug is modelled. This may be simplified/sped up by using a "square bubble model," in which the liquid level behind the slug is assumed to be uniform at the level of equilibrium stratified flow. In this case, the point model may be used to determine the slug fraction $\chi=L_{S,P}/L_{UC,P}=N_pL_{S,P}$, and then $N_P=\chi/L_{S,P}$.

Model for Initiation of Short Taylor Bubbles

The above model may be adapted to the initiation of short Taylor bubbles in bubbly flow. Since each pair of slugs is separated by a Taylor bubble, introduction of a new slug may lead to introduction of a new Taylor bubble. As a result, B can be regarded as the birth rate of slug units (i.e., a slug plus a Taylor bubble). Similarly, N represents the density of slug units, and $N_P$ represents the density of precursor units. For the transition from bubbly flow to slug flow, the minimum slip criterion takes the opposite form from that described above. More particularly, if a short Taylor bubble is introduced, it will grow if its front velocity (i.e., the slug tail velocity $V^T$) is greater than its tail velocity (i.e., the slug front velocity $V^F$). Thus, a model for the birth rate of slug units may include:

$$B = k_{B,disp}(N_P - N)\frac{V^T - V^F}{L_{B,P}} \tag{30}$$

In the case of a square bubble model, the precursor density may be given by $N_P=(1-\chi)/L_{B,P}$, where $L_{B,P}\approx10D$, for example, is the length at which the short Taylor bubbles become somewhat stable. In the absence of more accurate information, the tuning constant $k_{B,disp}$ may be assigned the same value as $k_{B,sep}$. The model described above may produce an approximation of the rate at which new slugs should be introduced. The lengths of the slug and slug bubble precursors used in the model $L_{S,P}\approx10D$ and $L_{B,P}\approx10D$ are not the same as the lengths of the new slugs or slug bubbles introduced into the simulation, which may be shorter (e.g., 1 or 2 diameters).

As discussed above, if a short Taylor bubble is introduced, it will grow if its front velocity (i.e., the slug tail velocity $V^T$) is greater than its tail velocity (i.e., the slug front velocity $V^F$). This may be closely equivalent to a different criterion. If the local fraction of gas in the bubbly flow is greater than the fraction of gas that would occur inside a slug in a slug flow, then a transition to slug flow may occur. The excess gas may be used to create the slug bubble.

Model for Spatial Density of Slug Bubble Precursors

The precursor density is given by $N_P=(1-\chi)/L_{B,P}$, where $\chi$ represents the slug fraction, and $L_{B,P}$ represents a selected value for the length of a short slug bubble son after initiation. As discussed above, there may be two ways to estimate the slug fraction: the "slug tail profile model" and the "square bubble model." The square bubble model gives a rough estimate, while the tail profile model is more detailed and may provide a more accurate estimate. There is also a third method, in which the square bubble model is modified by accounting for the momentum from the slug zone to the square bubble zone.

Figure 9:
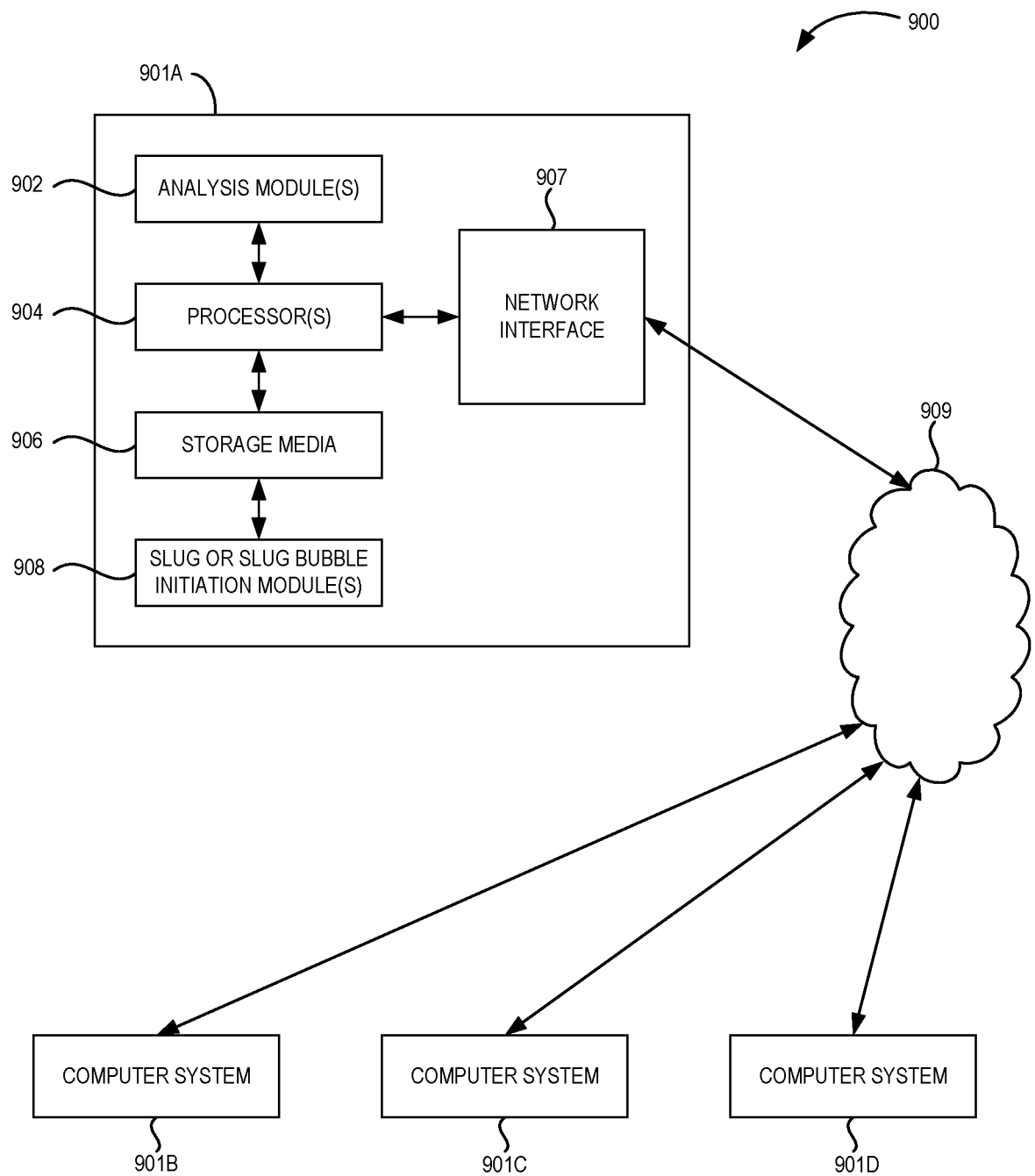
FIG. 9 illustrates a schematic view of a computing system, according to an embodiment.

In some embodiments, the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more analysis modules 902 that are configured to perform various tasks according to some embodiments, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor may include a microprocessor, microcontroller, processor module or subsystem, programmable integrated circuit, programmable gate array, or another control or computing device.

The storage media 906 may be implemented as one or more computer-readable or machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 900 contains one or more slug initiation module(s) 908. In the example of computing system 900, computer system 901A includes the slug initiation module 908. In some embodiments, a single slug initiation module may be used to perform some aspects of one or more embodiments of the methods disclosed herein. In other embodiments, a plurality of slug initiation modules may be used to perform some aspects of methods herein.

It should be appreciated that computing system 900 is one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

Fluid flow interpretations, models, and/or other interpretation aids may be refined in an iterative fashion; this concept is applicable to the methods discussed herein. This may include use of feedback loops executed on an algorithmic basis, such as at a computing device (e.g., computing system 900, FIG. 9), and/or through manual control by a user who may make determinations regarding whether a given action, template, model, or set of curves has become sufficiently accurate for the evaluation of the flow under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A computer-implemented method employing at least one processor having processor-implemented instructions to perform operations for modeling slug flow in multiphase fluid flow within one or more conduits, the operations comprising:

identifying conditions for slug precursor formation in a region where the multiphase fluid flow is separated;
in the event that conditions for slug precursor formation are identified, determining a slug birth rate in the multiphase fluid flow;
identifying conditions for slug bubble precursor formation in a region where the multiphase fluid flow is dispersed;
in the event that conditions for slug bubble precursor formation are identified, determining a slug bubble birth rate in the multiphase fluid flow;
initiating a slug in a fluid flow model of the multiphase flow based at least partially on the slug birth rate;
initiating a slug bubble in the fluid flow model of the multiphase fluid flow based at least partially on the slug bubble birth rate; and
displaying data representative of the slug flow in the fluid flow model after the slug is initiated or after the slug bubble is initiated.

2. The method of claim 1, wherein the conditions for slug precursor formation and the conditions for slug bubble precursor formation involve satisfaction of a minimum slip condition by the multiphase fluid flow.

3. The method of claim 2, further comprising calculating the minimum slip condition based at least partially on a difference between the slug front velocity and the slug tail velocity, wherein the minimum slip condition is satisfied when the slug front velocity is less than the slug tail velocity.

4. The method of claim 1, wherein:
the conditions for slug bubble precursor formation involves determining that a probability of slug formation exceeds a threshold number, wherein the probability for slug formation is based on determining a number of slug bubbles for the one or more conduits for one or more time periods based at least in part on the slug bubble birth rate.

5. The method of claim 4, wherein the threshold number is a random or pseudo-random number selected in a predetermined range of numbers.

6. The method of claim 1, wherein determining the slug bubble birth rate comprises:
determining a first difference between the slug front velocity and the slug tail velocity;
determining a second difference between a maximum number density of slug bubble precursors and a local number density of slug bubbles for the one or more conduits; and
determining the slug bubble birth rate based on the first difference, the second difference, and a diameter of the one or more conduits.

7. The method of claim 6, wherein initiating the slug bubble comprises probabilistically initiating the slug bubble based on a probability of slug initiation, and wherein the probability of slug initiation increases when the first difference increases, the second difference increases, or both increase.

8. The method of claim 1, wherein determining the slug bubble birth rate comprises determining the slug bubble birth rate based at least in part on a degree of instability of local dispersed flow and a spatial density of slug precursors.

9. The method of claim 1, further comprising modifying one or more properties of a fluid or a flow in a real-world pipeline network, or changing control settings in the real-world pipeline network, in response to the slug bubble being initiated, wherein the real-world pipeline network corresponds to the fluid flow model.

10. A computing system, comprising: one or more processors; and a memory system comprising one or more non-transitory computer-readable media storing instructions that, when executed by at least one of the one or more processors, cause the computing system to perform operations for modeling slug flow in multiphase fluid flow within one or more conduits, the operations comprising:
identifying conditions for slug precursor formation in a region where the multiphase fluid flow is separated;
in the event that conditions for slug precursor formation are identified, determining a slug birth rate in the multiphase fluid flow;
identifying conditions for slug bubble precursor formation in a region where the multiphase fluid flow is dispersed;
in the event that conditions for slug bubble precursor formation are identified, determining a slug bubble birth rate in the multiphase fluid flow;
initiating a slug in a fluid flow model of the multiphase fluid flow based at least partially on the slug birth rate;
initiating a slug bubble in the fluid flow model of the multiphase fluid flow based at least partially on the slug bubble birth rate; and
displaying data representative of the slug flow in the fluid flow model after the slug is initiated or after the slug bubble is initiated.

11. The system of claim 10, wherein the conditions for slug precursor formation and the conditions for slug bubble precursor formation involve satisfaction of a minimum slip condition by the multiphase fluid flow.

12. The system of claim 11, wherein the operations further comprise calculating the minimum slip condition based at least partially on a difference between the slug front velocity and the slug tail velocity, wherein the minimum slip condition is satisfied when the slug front velocity is less than the slug tail velocity.

13. The system of claim 10, wherein:
the conditions for slug bubble precursor formation involves determining that a probability of slug formation exceeds a threshold number, wherein the probability for slug formation is based on determining a number of slug bubbles for the one or more conduits for one or more time periods based at least in part on the slug bubble birth rate.

14. The system of claim 13, wherein the threshold number is a random or pseudo-random number selected in a predetermined range of numbers.

15. The system of 10, wherein determining the slug bubble birth rate comprises:
determining a first difference between the slug front velocity and the slug tail velocity;
determining a second difference between a maximum number density of slug bubble precursors and a local number density of slug bubbles for the one or more conduits; and
determining the slug bubble birth rate based on the first difference, the second difference, and a diameter of the one or more conduits.

16. The method of claim 1, wherein:
the conditions for slug bubble precursor formation involve determining that density of slug bubbles present in the conduit is not exceeding density of slug bubble precursors.

17. The method of claim 16, wherein:
the density of slug bubble precursors is based on a delay constant and a local mixture velocity of the multiphase flow.

18. The method of claim 16, wherein:
the density of slug bubbles present in the conduit is based on distances to nearest slug bubbles using a slug tail profile model.

* * * * *